United States Patent [19]

Maier et al.

[11] Patent Number: 4,956,956
[45] Date of Patent: Sep. 18, 1990

[54] CONNECTOR FOR CONNECTING TWO ELEMENTS

[75] Inventors: Friedrich Maier, Leonberg, Fed. Rep. of Germany; Fredi Dubach, Adetswil, Switzerland; Erich Röck, Höchst; Klaus Brüstle, Lauterach, both of Austria

[73] Assignee: Julius Blum Gesellschaft m.b.H., Höchst, Austria

[21] Appl. No.: 423,032

[22] Filed: Oct. 18, 1989

Related U.S. Application Data

[63] Continuation-in-part of Ser. No. 184,618, Apr. 21, 1988, abandoned, and a continuation-in-part of Ser. No. 337,402, Apr. 13, 1989, abandoned.

[30] Foreign Application Priority Data

| Apr. 22, 1987 | [DE] | Fed. Rep. of Germany | 3713483 |
| May 22, 1987 | [AT] | Austria | A1313/87 |
| Apr. 16, 1988 | [EP] | European Pat. Off. | 88106117.0 |
| Jun. 17, 1988 | [AT] | Austria | A1571/88 |

[51] Int. Cl.⁵ ............................................. E04C 5/16
[52] U.S. Cl. ........................................ 52/584; 52/126.1
[58] Field of Search ................................ 52/578–586, 52/127.1, 127.12, 126.1, 126.5; 403/326, 330, 13, 14

[56] References Cited

U.S. PATENT DOCUMENTS

| 2,142,388 | 1/1939 | Wallace | 52/484 |
| 3,236,487 | 2/1966 | Chakeres | 248/244 |
| 4,266,882 | 5/1981 | Wilhelmi et al. | 403/407.1 |

Primary Examiner—James L. Ridgill, Jr.
Attorney, Agent, or Firm—Wenderoth, Lind & Ponack

[57] ABSTRACT

A connector for connecting two structural elements in an endwise manner includes a pair of fitment members to be mounted on respective of the structural elements, a tie anchor and associated clamping structure for applying a pulling force to the fitment members in a first direction to clamp the fitment members together, and adjusting structure for adjusting the relative positions of the fitment members in a second direction perpendicular to the first direction.

57 Claims, 14 Drawing Sheets

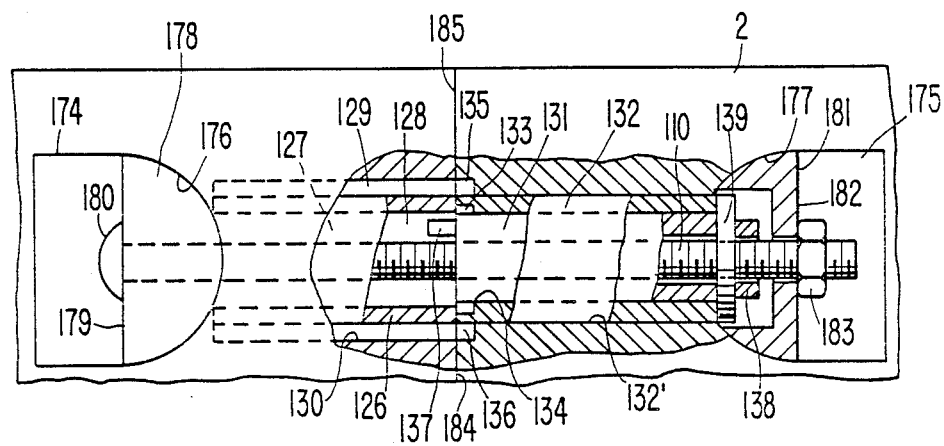
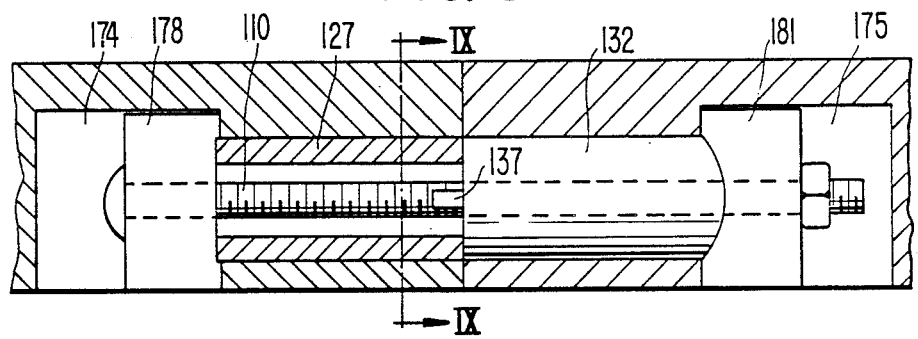
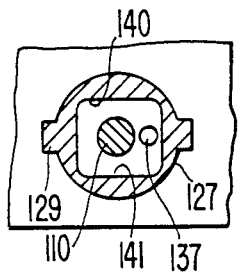
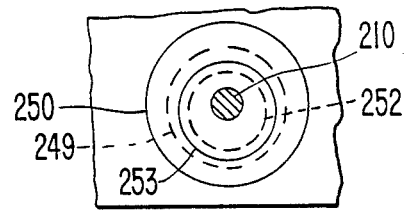
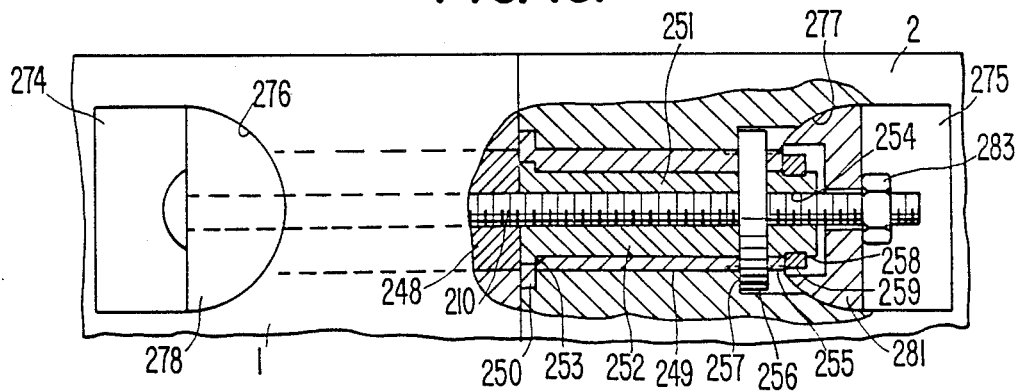

CONNECTOR FOR CONNECTING TWO ELEMENTS

This is a continuation-in-part of application Ser. No. 184,618, filed Apr. 21, 1988 now abandoned and of application Ser. No. 337,402, filed Apr. 13, 1989 now abandoned the disclosures of which hereby are incorporated by reference.

BACKGROUND OF THE INVENTION

The invention relates to a connector for connecting two structural elements or components, preferably for the endwise connection of two plates or panels, wherein each structural element has a fitting or fitment member in the region of connection, with at least one tie anchor which is supported on a respective one of the fitment members and which, by operation of clamping means and by way of the fitment members, applies a tensile force for connecting the structural elements.

A very wide range of different constructions of such connectors is already known. Particularly when connecting plates or panels in endwise relationship, it is important for the surfaces to be disposed precisely in one plane, since even a slight step will severely impede work on the plates or panels. In addition, such steps are disadvantageous for aesthetic reasons. In the case of known connectors which have only a tie anchor, the plates or the structural elements can be placed into the correct position only by a laborious and time-consuming operation of moving them into mutual alignment.

U.S. Pat. No. 3,236,487 discloses a connector device wherein two connector fittings are mutually connected by means of a horizontal tie-rod. In one or both of the fittings there is mounted a vertical height-adjustment screw which bears on the other fitting. Consequently, it is possible to obtain relative height adjustment of the plates by turning such height-adjustment screw or screws.

Conventional connectors have the drawback that for the mutual assembly of the plates a relatively large amount of lateral space must be available, that is to say space in the direction of tightening of the tie-rod, because the plates must first be brought, at least approximately, into a common horizontal plane and only then can the end face of one plate be moved laterally of the end face of the other plate.

SUMMARY OF THE INVENTION

The object of the present invention is to provide a connector of the above-indicated type, which is specifically adapted for the endwise connection of two structural elements such as plates or panels, and with which the structural elements can be quickly and precisely connected, without forming steps therebetween.

Another object of the present invention is to provide a connector device whereby it is possible for one plate positioned directly adjacent the other plate to be moved toward the other plate from a position above such other plate so that during assembly no more space is required laterally of the plates than actually is needed for the plates in the final mutually assembled state.

Yet another object of the invention is to provide an improved connector of this type and including two connector fittings that can be mutually coupled, at least provisionally, very quickly and without the aid of tools.

These objects are achieved in accordance with one aspect of the invention in that the connector has an adjusting means for adjusting the mutually relative positions of the structural elements in directions substantially perpendicular to the direction of pull of the tie anchor. With the adjusting means provided in accordance with this aspect of the invention it is possible quickly and precisely to fix the relative positions of the structural elements prior to the actual operation of tightening them together by means of the tie anchor. This is advantageous in particular in situations involving joints of substantial length, at which there are two or more connectors.

In accordance with one preferred embodiment of the invention precise adjustment can be effected by way of a pivotable two-armed lever that is supported in one fitment member and that engages in the oppositely disposed fitment member and that determines the relative positions of the structural elements, in accordance with respective adjustable pivotal positions of the lever. In this arrangement, it is possible to provide a tie anchor which is completely independent of the lever, for example in the form of a spring tongue which for assembly purposes can first be pushed entirely into one of the fitment members. When connecting plates or panels in endwise relationship, that gives the advantage that firstly only the adjusting arm of the two-armed lever has to be inserted into an opening in the oppositely disposed fitment member. It is only then that the spring tongue is pushed forward until it engages behind a nose or projection and thus provisionally connects the plates or panels. Prior to the operation of positively pulling the plates or panels together by means of the spring tongue, precise adjustment with respect to height is effected by pivoting of the two-armed lever.

In another embodiment of the connector according to the invention the adjusting means is arranged around the tie anchor and comprises in particular at least two cooperating adjusting portions, one of which is disposed in one of the structural elements to be connected and the other of which is disposed in the other structural element. For example, the tie anchor may be in the form of a rod and may be fixedly disposed in one structural element and be displaceable relative to the second structural element by way of an eccentric adjusting means which is disposed around the tie anchor, before the actual clamping operation is effected, for example, by way of a nut which is screwed onto the tie anchor. In that way the structural elements may be provided with the adjusting means in a rational fashion and can be quickly fitted together. The adjusting elements may be disposed in comparatively soft structural elements and not very precisely machined recesses or bores, without the function thereof suffering as a result. For correct positioning and shape of the structural elements which are clamped together, in this embodiment it is also advantageous that, for the purpose of connecting plates or panels, in particular panels of articles of furniture, the recesses which are milled on the undersides of the panels are connected not by open grooves but by mutually aligned bores which accommodate the tie anchor and the adjusting means. That ensures that the panels do not suffer from buckling in certain regions thereof.

In another embodiment of the connector according to the invention it is advantageously provided that the tie anchor and the adjusting means can be completely pushed into and withdrawn from the fitment member or members for transportation or storage and/or for positioning of the two structural elements. That permits simple transportation of the elements (plates or panels)

to be connected, for example, from a furniture factory to warehouses for intermediate storage and finally to the place of assembly, without running the risk of damaging any fitment members which project beyond the ends of the plates or panels. However, such complete retractability also offers advantages with regard to the assembly operation itself, more specifically when the work panels cannot be pushed together perpendicularly to the end faces thereof, due to the space available, but must be put into the position for connection thereof by movement in a direction parallel to the end faces thereof. That would not be possible at all if adjusting means or tie anchors were to project from the panels. In such connection it is advantageous for the adjusting means and the tie anchor to be combined, for example in that a height adjusting lever can also be tightened or moved in the pulling direction, without changing its position with respect to height, thereby also acting as a tie anchor. The inward and outward movements of the tie anchor and/or the adjusting means are effected without any particular loading, but for that purpose a substantial adjustment movement is necessary. A form of drive which is particularly suitable for that purpose is a toothed rack drive which is independent of the actual clamping mechanism.

However, the tie anchor may also be such that it can be simply pushed in against the force of a spring, in which case it either carries the adjusting means or the latter is disposed in another fitment member which does not project beyond the end face. Thus, one of the connector fittings may be provided with an elastic or elastically loaded locking part or member which, when the two fittings or fitment members are mutually assembled, engages in or on a height adjustment device which is provided in or on the other connector fitting or fitment member. This arrangement allows one plate to be moved toward the other plate from above and thus to be moved into a connecting position. The elastic or elastically loaded locking part is capable of yielding initially against the elastic force and thereafter engages in or on the height adjustment device provided in the other fitting, whereupon the ability for relative plate adjustment already is provided.

A preferred embodiment, wherein the locking part arranged in one of the connector fittings is, when the fittings are in correct position for connection to be made, elastically pre-tensioned or biased substantially in a direction towards the other fitting, provides in a very simple manner assurance of reliable engagement between the adjustment device and locking part within a certain range, irrespective of the relative positions of the two fittings in a direction of clamping together of the two fittings. In view of tolerances involved in finishing treatment of the end faces of the two plates and in the clamping together of the plates, this arrangement always ensures proper height adjustment. It is even possible to clamp the plates lightly together, then, e.g., after finger-touch examination of the joint between the plates, to make the correct relative height adjustment, thereafter to push the plates slightly apart again in order to apply adhesive or silicon therebetween, and finally to clamp the plates permanently together. During the course of such movements in the clamping direction the elastically pre-stressed locking part of one fitting follows the height adjustment device of the other fitting and thus guarantees that height adjustment will be achieved. It is advantageous to provide that the adjustment device is a screw with a disc-shaped head which is engaged by the locking part.

In one arrangement the locking part is a leaf spring or plate spring which yields in the clamping direction and has a slot or slit into which the edge or rim of a head of the screw engages. The plate or leaf spring may be held in the respective connector fitting by two webs thereof that have slits into which the spring extends. According to an advantageous feature a first of the connector fittings is of box- or cup-like design and the other connector fitting includes an extension lug or projection adapted to be inserted into the first fitting substantially at right angles relative to the abutting clamped ends of the plates or panels.

Another arrangement provides that the locking part is a spring loaded lever mounted pivotally on a vertical axis in one connector fitting. The lever preferably is positively guided in such connector fitting, that is to say it can yield neither upwardly nor downwardly. Such lever includes a recess or notch with upper and lower end stop faces within which the rim of the screw head engages. The fitting in which the screw is mounted can be adjusted in height by rotation of the screw relative to the fitting in which the lever is mounted. In order to facilitate the pressing down of one fitting onto the other and the escape or yielding of the lever, it is an advantage to arrange for the lever to be provided at its lower edge within the range of the screw with an inclined face, since then the lever will initially yield automatically and then engage of its own accord with or in the adjustment device. The notch is of segment-like configuration as viewed from above. In order to allow simple relative disengagement of the two fittings of the connector device, according to a preferred embodiment of the invention an eccentric is provided by means of which the lever can be pivoted against the loading of the spring and thus lifted off the head of the screw. Thus, the screw head functions not only as the height adjustment device but also as a snap engagement part.

According to a further advantageous feature, the clamping screw and the screw of the adjustment device are relatively aligned parallel to each other and the clamping or tightening screw has a tapered or pointed end that bears against an inclined face or surface provided in or on the other fitting. By the snap-fit engagement of the elastically stressed or inherently elastic locking part in or with the adjustment device and the simultaneous engagement of the tightening screw with the inclined surface of the other connector fitting it is possible to achieve easily and quickly without the aid of tools a provisional state of connection between the two fittings, after which height adjustment and final clamping together can be achieved.

The clamping or tightening screw and the screw of the adjustment device may be arranged side-by-side transversely of the direction of tightening of the connector fittings or may be aligned in such direction. It is assumed that at least two connector devices are required for mutually connecting two plates. It is therefore of no consequence if the clamping screw is arranged off-center, since any torque components which may occur will be compensated in the system as a whole.

In addition, in accordance with another preferred embodiment of the connector according to the invention, it may be provided that the connector has two identical main fitment members which are arranged in the two elements to be connected, and that in addition there is provided an insert member which can be selectively fitted into one of the main fitment members prior to the elements being connected and by way of which it is possible both to fix the relative position of the elements perpendicularly to the pulling direction and also to apply a tensile force in the pulling direction to the other main fitment member. In this arrangement the main fitment members do not project beyond the end faces of the elements to be connected, which is advantageous with regard to transportation and storage, and may already be fixed in the structural elements (plates or panels) in the furniture factory. The person assembling the construction then only needs to install the insert member at the location at which the plates or panels are fitted together. The great advantage in this arrangement is that the person assembling the construction can freely select which one of the two main fitment members into which the insert member is to be fit, at the location at which the construction is to be assembled, depending on the better option with regard to actuation for adjustment of height and clamping the structural elements together.

Another possible way of leaving the person assembling the construction free to decide on which side of the joint between the two plates actuation of the connector is to be achieved, is by providing each of the two fitment members in the form of an identical cup-like fitment member with a fixing flange projecting symmetrically with respect to the pulling direction. Such members, prior to the operation of connecting the structural elements, can be fitted into recesses therein which are provided by the manufacturer of the furniture. In that case, only the recesses for the fitment members are provided in the furniture factory. The assembler can then fit the active fitment member, which carries the elements for adjusting and tightening the tie anchor, to that panel or plate to which he has better access from below, and mount the passive member (with cooperating-retaining means or the like) in the other plate or panel.

Compact and precise adjustment which also permits displacement without changing, for example, the set relative height of the plates or panels is advantageously possible by virtue of the fact that the adjustment means for adjusting the relative positions of the structural elements can be a disc which is mounted rotatably in one fitment member and whose axis of rotation extends perpendicularly to the pulling direction and which is adjustable with respect to height in the direction of such axis of rotation. The other fitment member has a groove or a slot into which a peripheral portion of the disc engages in the connecting position. Thus when dealing with plates or panels, it is also possible to provide for adjustment parallel to the end edges, such adjustment being of small magnitude, e.g. produced manually. The disc may be mounted rotatably and adjustably with respect to height on a pivotable rocker member which is spring-loaded in the direction of the groove. The groove may be provided transversely with respect to the pulling direction at the end of a projection on one fitment member, the projection extending into the other fitment member in the connecting operation.

In order to permit easy dismantling, in particular when dealing with a plurality of connectors which are distributed over the end of an element, a latch or detent portion on the tie anchor, which normally automatically drops into a cooperating retaining means on the other fitment member, can be held in an open position by way of the clamping means being disposed in a given non-clamped position.

It is further provided that each of the connector fittings is of box- or cup-like configuration and includes at least one flange with one or more securing screws.

BRIEF DESCRIPTION OF THE DRAWINGS

Further details and advantages of the invention will be described in greater detail in the following specific description of embodiments of the connector according to the invention, with reference to the accompanying drawings in which:

FIG. 7 is a view from below in partial section of a second embodiment;

FIG. 8 is a view of the second embodiment from the longitudinal side of the panel, partly in section;

FIG. 9 is a sectional view taken along line IX—IX in FIG. 8;

FIG. 10 is a view from below of a third embodiment;

FIG. 11 is a view of a portion of the end to be connected of the working panel shown at the right in FIG. 10;

DETAILED DESCRIPTION OF THE INVENTION

Figure 1:
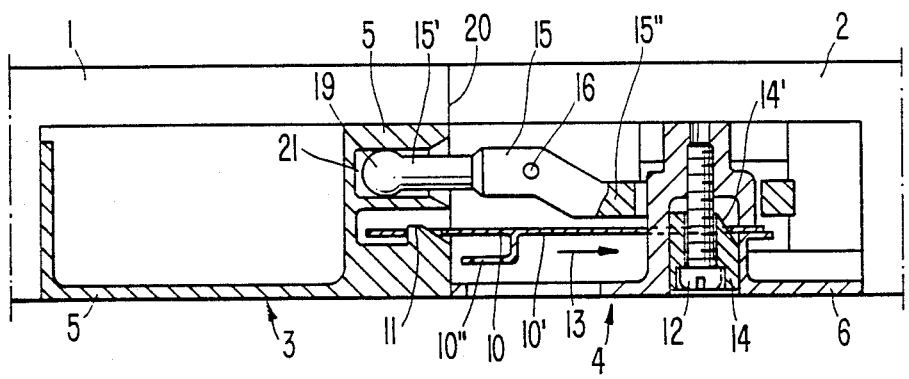
FIG. 1 is a view in vertical section through a first embodiment of a connector according to the invention for connecting two work panels or plates or work top members.
Figure 2:
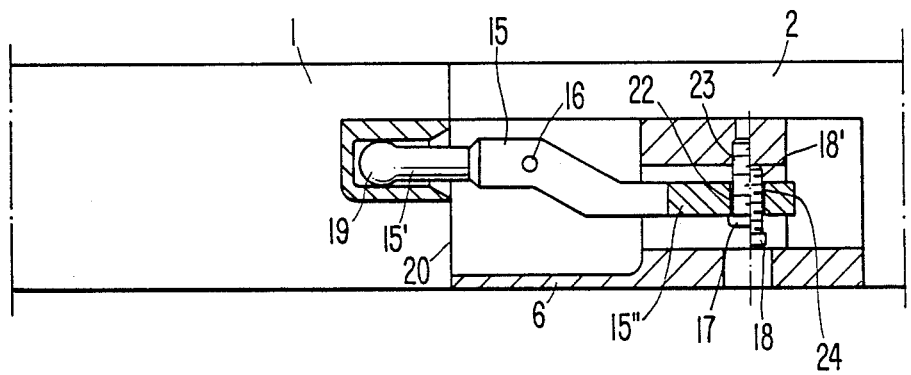
FIG. 2 is a view in vertical section parallel to the view of FIG. 1.
Figure 3:
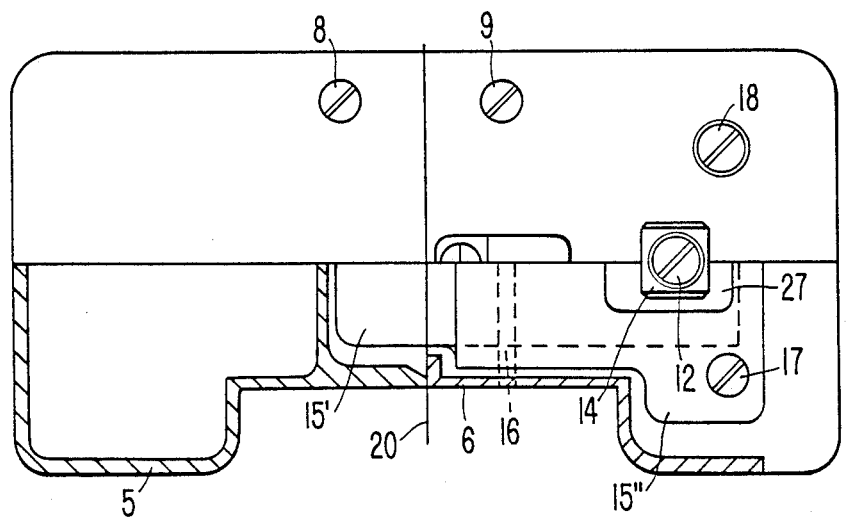
FIG. 3 is a partly horizontally sectional view from below of the first embodiment.

The connector shown in FIGS. 1 through 3 for fixedly and precisely connecting two working panels or work top members 1 and 2 comprises two fitment members which are generally identified by reference numerals 3 and 4 and which include respective housings 5, 6. Each housing is fitted into a respective recess which is milled in the working panel 1 or 2 and is fixedly connected thereto by means of respective housing fixing screws 8 or 9.

The fitment member 4 has a tie anchor which is in the form of a spring tongue or plate 10 which, when the working panels 1 and 2 are pushed together as shown in FIGS. 1 through 3, engages behind a hook or projection 11 in the other fitment member 3 and which, by operation of clamping means, by way of the fitment members 3 and 4, applies a pulling or tensile force for connecting the panels 1 and 2 together. In the illustrated embodiment the clamping means simply comprises a clamping member 14 which is displaceable perpendicularly to the pulling direction (arrow 13) by way of a screw 12 and which, when the screw 12 is screwed in, displaces the spring tongue 10 in the pulling direction 13 by means of an inclined surface 14' which engages the end of a slot 10' in the spring tongue 10, whereby the clamping member 14 applies a pulling or tensile force to the panel 1 by way of the hook 11.

Provided independently of the tie anchor (spring tongue 10) or the clamping means thereof (screw 12, clamping member 14) is an adjusting means for sensitive adjustment of the relative positioning (in the present case, with respect to height) of the panels 1 and 2, perpendicularly to the pulling direction 13 of the tie anchor. In this embodiment the adjusting means essentially comprises a two-armed lever 15 which is mounted pivotably in the housing 6 about a horizontal axis 16 which is disposed perpendicularly to the pulling direction 13 of the spring tongue 10 and perpendicularly to the vertical direction of adjustment. The lever 15 is adjustable with respect to its pivotal position in a manner which will be described in greater detail hereinafter, by means of adjusting screws 17 and 18 (see FIG. 2). An adjusting arm 15' of lever 15 projects beyond a connection surface 20 of the panel 2 and engages into a corresponding recess or opening 21 in the fitment member 3 of the other panel 1. A thickened portion 19 whose thickness is equal to the inside height of the recess 21 serves to permit the adjusting arm 15' to be pivoted relative to the recess 21, so that no play or clearance has to be provided in a vertical direction.

The lever 15 is substantially of a plate-like configuration and occupies a large part of the width of the fitment member (see FIG. 3). In that way it is possible to avoid punctiform loadings in the recess 21, while in addition, with a wide lever 15 of such type, there are better options with regard to engagement for the adjusting means which comprises the two parallel screws 17 and 18 which are passed through another arm 15" of the lever 15. One screw 17 is passed through a bore 22 in the lever 15 and can be screwed into a screwthread 23 in the fitment member 4 (the left-hand half of the screw 17 is shown in section in FIG. 2). The head of screw 17 then can pivot the lever 15 in the counterclockwise direction and the working panel 1 will move downwardly relative to the panel 2 (with the spring tongue 10 still in the non-clamped condition). The other screw 18 is passed through a screwthread 24 in the arm 15" of the lever 15 and bears with its shank 18' against the fitment member 4, at the top thereof. When screw 18, the right-hand half of which is shown in section in FIG. 2, is screwed into the screwthread 24, the lever 15 is pivoted in the clockwise direction and the panel 1 is raised relative to the panel 2. The two adjusting screws 17 and 18 permit sensitive and precise adjustment of the two working panels 1 and 2 before they are fixedly clamped together by way of the spring tongue 10.

Figure 4:
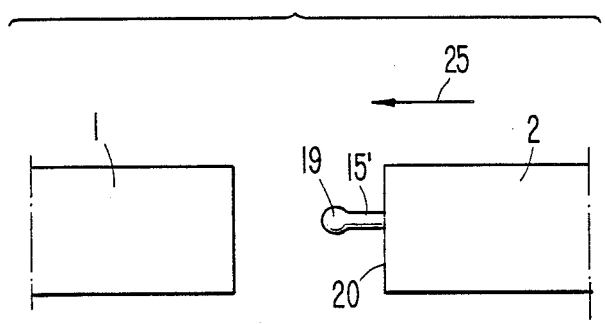
FIGS. 4, 5 and 6 are diagrammatic side views in partial section illustrating phases of connecting two working panels or work top members by means of the connector of the first embodiment of the invention.
Figure 5:
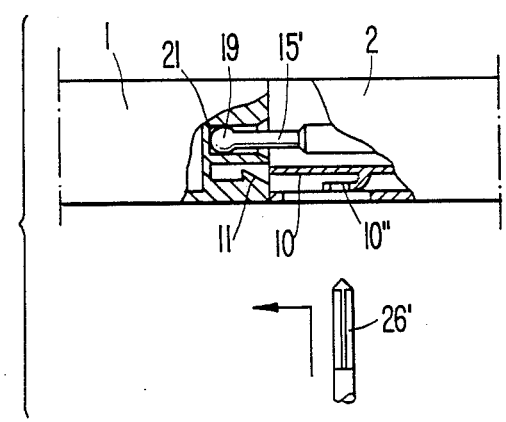
Figure 6:
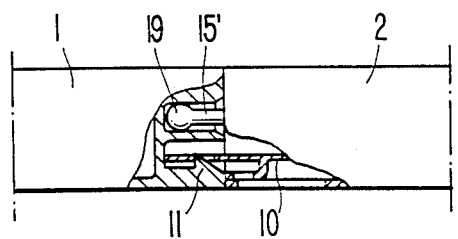
Figure 12:
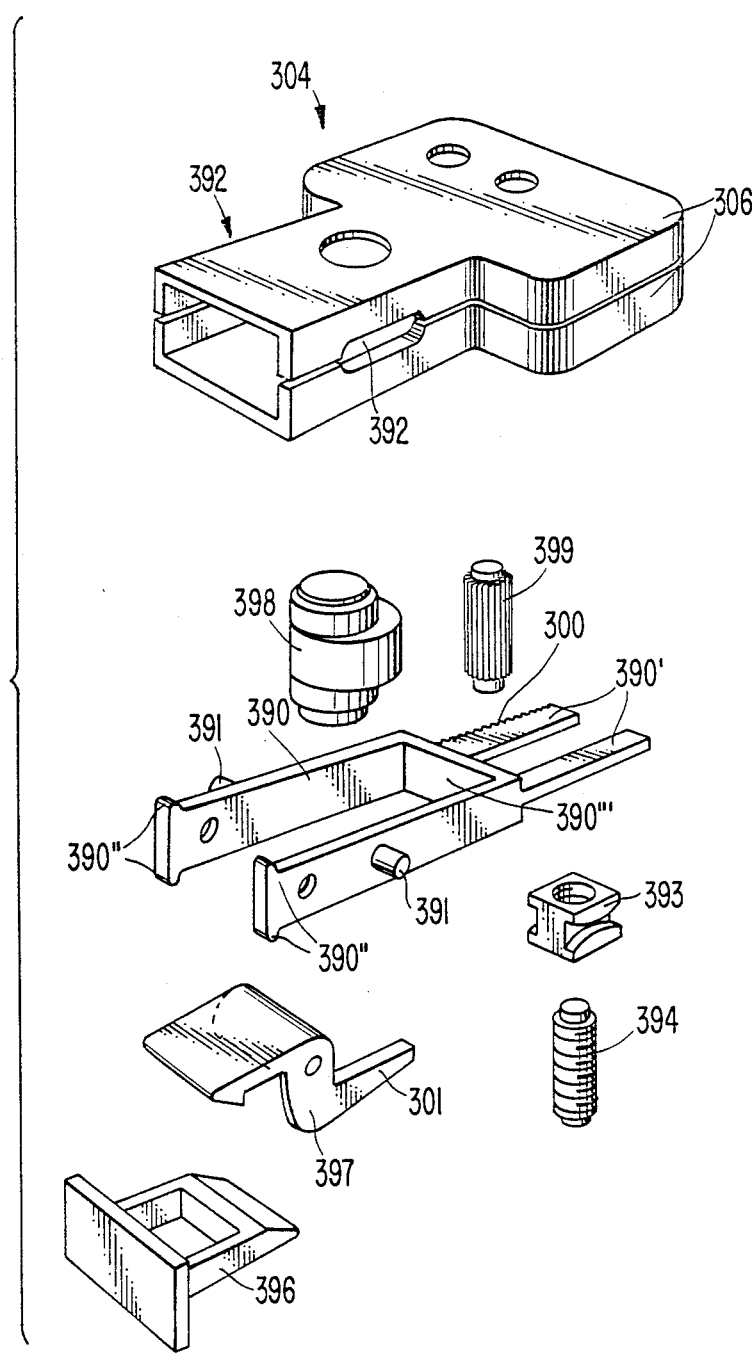
FIG. 12 is a perspective exploded view of essential components of an operative fitment member and a holding bar assembly of a cooperating holding fitment member of a fourth embodiment of the connector according to the invention.
Figure 13:
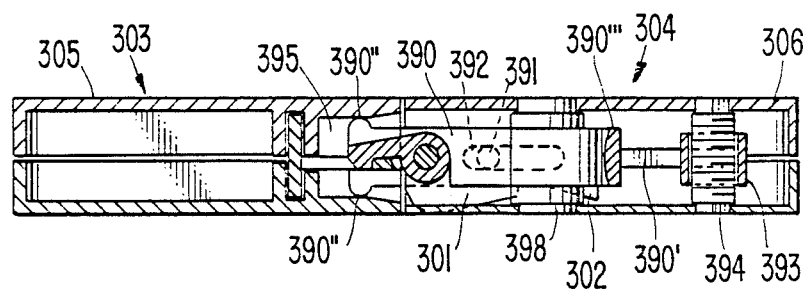
FIG. 13 is a view in vertical section and FIG. 14 is a view in horizontal section through fitment members of the fourth embodiment shown in the connecting position thereof.
Figure 14:
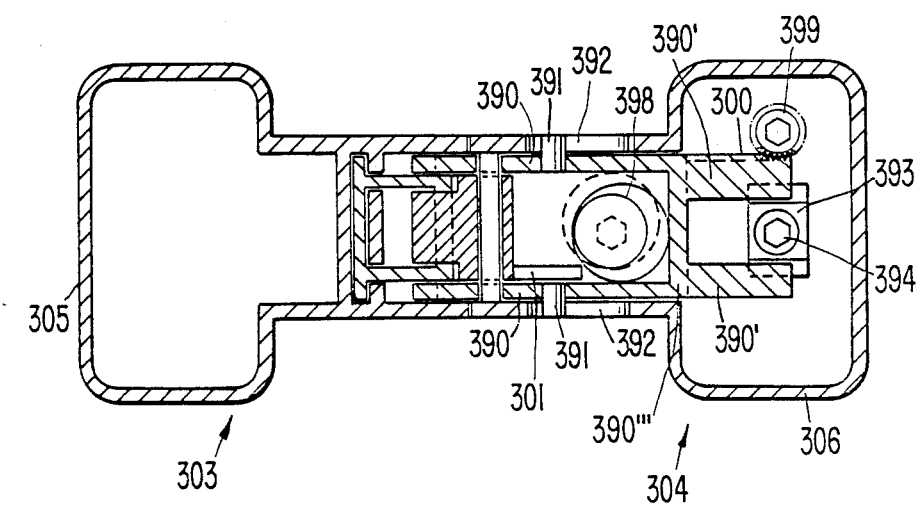
Figure 15:
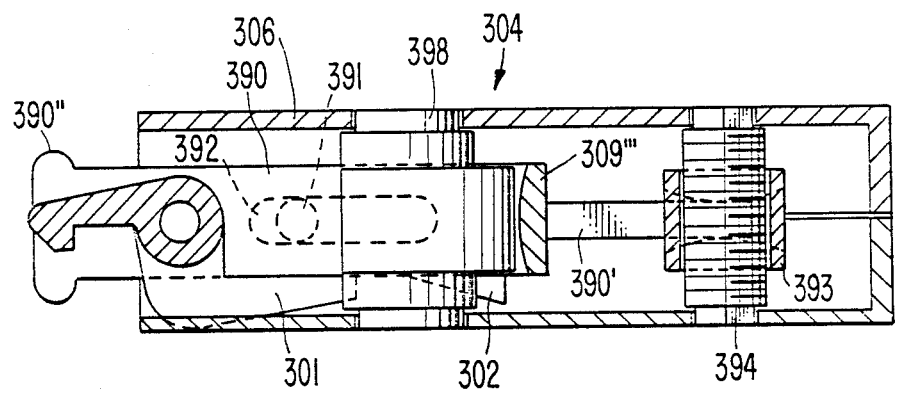
FIG. 15 is a view in vertical section and FIG. 16 is a view in horizontal section through an operational fitment member of the fourth embodiment.
Figure 16:
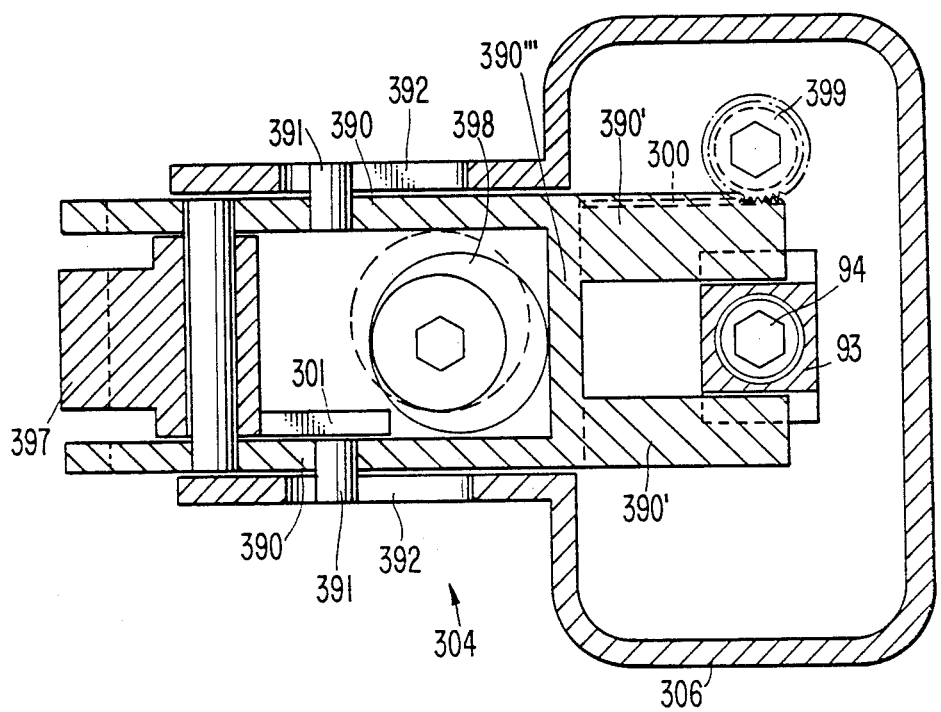

FIGS. 1 through 3 show the working panels 1 and 2 in the connected position in which they are already precisely adjusted. The phases of the operation of connecting the working panels 1 and 2 are shown diagrammatically in FIGS. 4 through 6. As shown in FIG. 4, the two working panels 1 and 2, which each have a respective fitment member according to the invention fitted thereto, are moved towards each other in the direction indicated by the arrow 25. In that situation only the adjusting arm 15' projects beyond the connecting surface 20. The spring tongue 10 is entirely retracted into the fitment member 4, the clamping member 14 and the screw 12 being disposed at the front end of the slot 10' in the spring tongue 10. The fact that only the adjusting arm 15' projects from the working panel 2 provides the advantage that initially it is simply and solely the adjusting arm 15' that has to be introduced into the recess 21 in the other panel 1. That is advantageous in particular when dealing with long connections involving a plurality of connectors and when dealing with heavy structural elements. FIG. 5 shows the two working panels 1 and 2 after they have already been adjusted with respect to height. Generally however, prior to the adjustment with respect to height (by way of the lever 15), the spring tongue 10 will be pushed towards the left in FIG. 5, for example by means of a screwdriver 26', by way of an actuating member 10" provided for that purpose, until the hook 11 engages into an opening in the spring tongue 10 and thus the spring tongue 10 engages behind the hook 11 (FIG. 6). That provides a provisional connection between the panels 1 and 2. After adjustment has been effected with respect to height by way of the adjustment screws 17 and 18 and the lever 15, the working panels 1 and 2 then are immovably fixedly connected together by way of the clamping member 14 and the spring tongue 10.

In the first embodiment, the clamping means, i.e. screw 12 and member 14, for the tie anchor 10 and the essential elements 15, 16, 17 and 18 of the adjusting means for adjusting the relative positions of the working panels are disposed in one and the same fitment member 4, with the lever 15 which is of a plate-like configuration having a recess 27 for accommodating the clamping means 12, 14. In that way, the other fitment member 3 need be provided only with "passive" elements such as the hook 11 and the recess 21. It will be appreciated that in principle it is also possible for the adjusting means to be disposed in one fitment member and the clamping means for the tie anchor to be disposed in the other fitment member.

In the second embodiment shown in FIGS. 7 through 9, two working panels or plates 1 and 2 are clamped together by means of a tie anchor 110. For that purpose, a recess 174, 175 is milled out on the underside of each panel 1 and 2. Each recess is provided with a rounded end surface 176 and 177 on its side which is towards the other panel. Bearing against the end surface 176 of the recess 174 is a support member 178, with a head 180 at one end of the tie anchor 110 bearing against a contact surface 179 of the support member 178. Bearing against the end surface 177 of the other panel 2 is a support member 181, a nut 183 bearing against a contact surface 182 thereof. The nut 183 is screwed onto the other end of the tie anchor 110 in such a way as to produce the force which clamps the working panels 1 and 2 immovably together at confronting end faces 184 and 185 thereof.

The working panel 1 which is shown on the left has a bore 126 which connects the recess 174 to the end face 184 and disposed in the bore 126 is a sleeve 127 serving as an adjusting member. Sleeve 127 has an axial cavity 128 of substantially rectangular cross-section surrounding the tie anchor 110 with a space therebetween. The sleeve 127 is prevented from rotating by means of bar or rib portions 129 which engage into corresponding grooves 130 in the panel 1.

Disposed in the working panel 2 which is shown on the right is a sleeve 131 which is disposed around the tie anchor 110, with clearance therebetween, and which is guided rotatably in a bush 132 which is disposed in a bore 132′ in the panel 2. The bush 132 is prevented from longitudinal displacement by a shoulder 133 which engages into a corresponding recess 134 which is turned out in the bush 132. The bush 132 is in turn prevented from rotary and longitudinal movement by projections 135 which engage into corresponding recesses 136 in the working panel 2.

Provided at the end of the sleeve 131 is a projection 137 which engages into the cavity 128 when the working panels 1 and 2 bear against each other. The end of the sleeve 131 which is remote from the panel 1 carries a screwthread 138 onto which is screwed a ring nut 139. When the working panels 1 and 2 are fitted together, the members serving as the adjusting means, namely the sleeve 127 and the sleeve 131, are in the position shown in FIG. 9. The nut 183 and the support member 181 have not yet been fitted into position. The ring nut 139 is only loosely screwed on the screwthread 138. If now the top surfaces of the working panels 1 and 2 are not precisely aligned, the sleeve 131 is turned in the appropriate direction. When that happens, the projection 137 bears against a horizontal wall 140, 141 in the cavity 128 and displaces the sleeve 127 and therewith the working panel 1 upwardly or downwardly as desired until the working panels are in the correct relative positions. The movements involved are minor movements of up to 1 or 2 mm. When the correct position is reached, the ring nut 139 is tightened and thus the relative positions of the working panels are fixed. Thereupon the support member 181 is fitted into position and the nut 183 is screwed on and tightened. The two working panels are thus fixed immovably relative to each other by being pressed together. In that way it is possible to produce the connection in a quick and secure fashion, in particular even when the end edges 184 and 185 are relatively long so that a plurality of tie anchors and corresponding adjusting means have to be provided.

In the third embodiment shown in FIGS. 10 and 11, the arrangement again includes a tie anchor 210 which clamps the working panels 1 and 2 together and which is clamped by means of a nut 283 between support members 278 and 281, in the same manner as in the second embodiment. A sleeve 248 is in a close fit in the working panel 1, and the tie anchor 210 is in a close fit in the sleeve 248. A bush 249 is fitted with a close fit but rotatably in the working panel 2, the bush 249 being prevented from axial movement by a shoulder 250. A sleeve 252 is in a close fit but rotatable in an eccentric bore 251 in the bush 249. The sleeve 252 engages with a shoulder 253 formed by a recess in the bush 249 and by means of an eccentric bore 254 accommodates the tie anchor 210 which is fitted with a close fit therein. The end of the bush 249 remote from the other working panel 1 has a screwthread 255 onto which a ring nut 256 is screwed. The ring nut 256 engages into a recess 257 in the working panel 2. The corresponding end of the sleeve 252 carries on a screwthread 258 a second ring nut 259 which bears against the end face of the bush 249.

In accordance with the embodiment shown in FIG. 10, prior to the nut 283 being tightened, the two working panels 1 and 2 are aligned relative to each other with respect to height. For that purpose the bush 249 and the sleeve 252 are rotated in opposite directions in such a way that the working panel 2 is moved upwardly or downwardly relative to the tie anchor 210, depending on the way in which the two eccentric bores 251 and 254 are disposed relative to each other. If necessary it is also possible to adjust the lateral positioning of the working panels in the same manner. When the correct setting has been found, the ring nut 256 is tightened to cause the bush 249 to be fixed in position in the working panel 2 and the sleeve 252 is fixed in position in the bush 249 by tightening the ring nut 259. The relative positions of the panels 1 and 2 are determined in that way. After the support member 281 has been fitted and the nut 283 has been tightened, the working panels are immovably fixed relative to each other.

The support members for tightening the tie anchor may also be made for example from sheet metal strips, instead of the illustrated shaped members which are produced predominantly from plastic material. The sheet metal strips are applied to the end faces 276 and 277 or they may be of another shape which increases the contact surface area. When connecting harder components which for example consist of metal, it is possible to omit the support members 178, 278 and 181, 281 of the second and third embodiments, and likewise the sleeve 248 of the third embodiment. The recesses 174, 274 and 175, 275 may also be larger to facilitate introducing and tightening the adjusting means and the clamping means. In addition the dimensions of the working panels are usually greater in comparison with the diameter of the adjusting means shown in FIGS. 7 through 11.

The fourth embodiment of the connector shown in FIGS. 12 through 16 comprises an active fitment member 304 (FIGS. 12, 15 and 16) and a passive fitment member 303 (at the left in FIGS. 13 and 14), wherein the two fitment members 303 and 304 each include a two-part housing 305 or 306, respectively, which are of the same outside dimensions and which are fixed in structural elements to be connected (not shown herein), in respective end regions thereof. Two-part closed housings 305 and 306 of this type are easy to produce, for example from zinc die castings which are stable with respect to shape over a long period of time, and permit the essential operative components of the connector to be disposed in a protected situation.

In the fourth embodiment of the invention a two-armed lever 390 (connecting member) which is of a forked configuration (see in particular FIG. 12) essentially performs the function of adjustment with respect to height perpendicularly to the pulling direction and also the function of the tie anchor itself, i.e. transmitting the tensile or pulling clamping force. Accordingly, when making a connection, only one common group of components 390, 397 needs to be introduced into the oppositely disposed fitment member 303, and that facilitates handling. For transportation purposes such group of components 390, 397 can be entirely withdrawn as a unit into the active fitment member 304, as will be described in greater detail hereinafter.

For the purpose of performing the function of adjustment with respect to height, the lever 390 is pivotable about two spindle portions or trunnions 391 which are guided in slots 392 in the housing 306. The pivotal position of the lever 390 may be adjusted by means of a grooved member 393 in which two bar portions 390' on the lever 390 can slide in the pulling direction and which is adjustable with respect to height by way of a screw 394. The lever 390 has slightly outwardly curved end portions 390", the thickness of the outwardly curved portions corresponding to the inside width of a recess 395 in the other fitment member 303. That advantageous configuration ensures that the lever 390 has a snug fit in the recess 395, while pivotal movement about the axes 391 easily is possible.

As already mentioned, the lever 390 also performs the tie anchor function, which is possible by virtue of the guidance in the slots 392 and in the member 393, without a change in position relative to height. For the purposes of transmitting the pulling force to the other fitment member 303, the lever 390 is provided in its front end region with a pivotable latch 397 which, when the structural elements are pushed together, automatically drops into a cooperating retaining means (holding bar 396) in the other fitment member 303. An upright eccentric cam 398 bears against a web portion 390''' of the fork configuration of the forked lever 390 and, when suitably rotated, pulls the holding bar 396 forwardly by way of the lever 390 and the latch 397, so that the structural elements can be fixedly connected together. As can be seen from FIG. 15, the web portion 390''' of the fork structure of the lever 390 is of a slightly curved configuration. In that way the eccentric cam 398 always will bear against the web portion 390''' of the fork structure, irrespective of the pivotal position of the lever 390.

The arrangement also includes a toothed rack drive including a pinion 399 and a row of teeth 300, by way of which the lever 390 together with the latch 397 can be quickly and completely withdrawn into the housing 306 of the fitment member 304 and extended again therefrom, in the non-loaded condition. When the lever 390 is in the retracted condition, no parts project beyond the end face of the structural elements (plates or panels), which projecting parts could suffer damage upon transportation or storage. In addition, it is also possible for the structural elements which are to be connected together to be brought into position in a direction parallel to the end faces thereof (for example when fitting a working panel or a window sill member from above). For making the connection, firstly the lever 390 together with the latch 397 is extended by way of the rack drive 399, 300 until the latch 397 engages into the holding bar 396. Precise adjustment of the structural elements (for example adjustment with respect to height of the working panels) is effected by way of the screw 394, whereupon the structural elements then are pulled together by way of the eccentric cam 398. Actuation of the pinion 399, the means 394 for adjustment with respect to height and the eccentric cam 398 are effected for example by means of a screwdriver or by means of a socket-head wrench, through openings in the housing 306 of the active fitment member 304.

In order to permit simple release of the connector shown in FIGS. 12 through 16 (particularly when the situation involves a plurality of connectors disposed along a joint), the latch 397 has a projection 301 that can be acted upon by a wedge surface 302 of the eccentric cam 398, when rotated away from the web portion 390''' of the forked configuration to thereby open the latch 397. Therefore, for the purposes of dismantling the two structural elements, it is only necessary for the eccentric cams 398 of the connectors to be suitably displaced, so that the structural elements can then be pulled apart.

Figure 17:
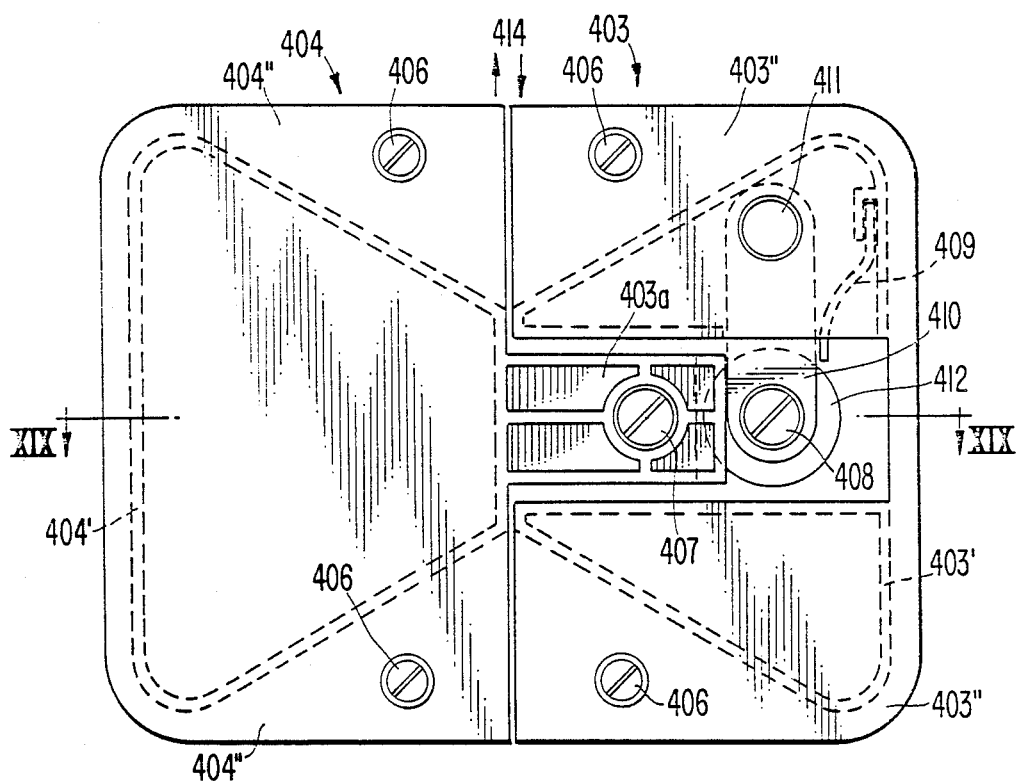
FIG. 17 is a view from below of a fifth embodiment of the connector of the invention.
Figure 18:
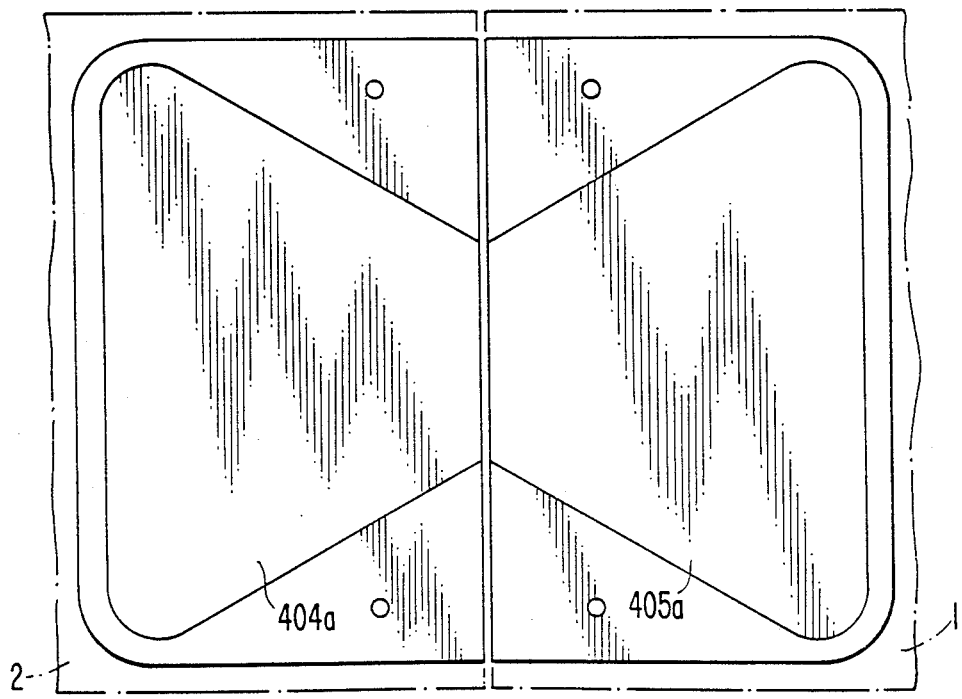
FIG. 18 is a view showing the shape of recesses in plates or panels to be connected by the connector shown in FIG. 17.
Figure 19:
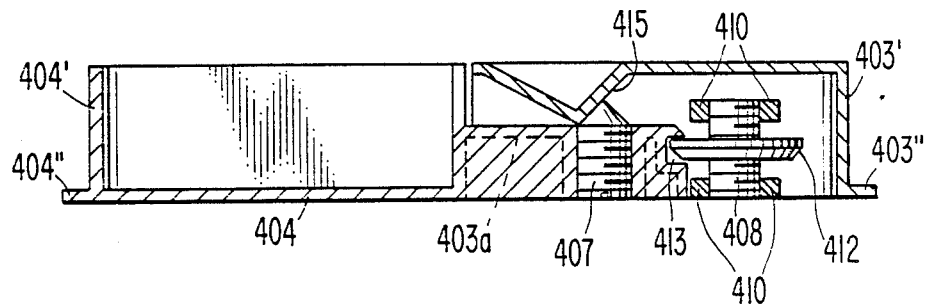
FIG. 19 is a sectional view taken along line XIX—XIX in FIG. 17.

The fifth embodiment shown in FIGS. 17 through 19 includes two fitment members 403 and 404 having cups or housings 403', 404' which are of identical outside dimensions, with fixing flanges 403" and 404" which project symmetrically with respect to the pulling direction. In this embodiment it is envisaged that the furniture manufacturer provides cut-out recesses 405a and 404a for the respective fitment members 403 and 404, in the structural elements, for example working panels 1 and 2 (see FIG. 18), but the furniture manufacturer does not yet fit the fitment members themselves. That operation is left for the assembler who can decide on site which fitment member 403 or 404 is to be fitted into which recess 404a or 405a, by being screwed to the corresponding structural elements by means of the screws 406, before he joins the structural elements 1 and 2 together. In that situation the assembler will make his choice in such a way that he has better access with a screwdriver for actuating a clamping screw 407 and a height adjustment screw 408, which will be described hereinafter.

A rigid projection 403a on the fitment member 404 which is at the left in FIGS. 17 through 19 is crucial with regard to the tie anchor function and the height adjustment function (adjustment of the relative positions of the working panels to be connected together). For the purpose of adjustment with respect to height, a rocker member 410 which is spring-loaded (spring 409) and which is mounted in the fitment member 403 pivotably about a vertical axis 411 has a disc portion or member 412 which is adjustable with respect to height by way of the screw 408. The disc portion 412 engages into a groove 413 in the projection 403a on the other fitment member 404 and moves it up and down relative to the fitment member 403. Adjustment with respect to height by way of the disc portion 412 and the groove 413 which extends transversely with respect to the pulling direction is very compact and also permits subsequent adjustment, e.g. manually, of the two working panels to be connected together, in the directions indicated by the arrows 414, with the disc portion 412 rolling or sliding in the groove 413. The mounting of the disc portion 412 on the spring-loaded rocker member 410 is advantageous when introducing the projection 403a into the fitment member 403. More specifically, if the level of the disc portion 412 and the groove 413 are not initially coincident, the rocker member 410 initially deflects in a rearward direction. Then, by virtue of the working panels being brought into proper alignment with each other or by adjustment of the disc portion 412 by way of the screw 408, the disc portion 412 then snaps into the groove 413, under the force of the spring 409. The disc portion 412 is slightly bevelled or chamfered in order to facilitate the snap-engagement thereof into the groove 413.

For the purposes of bracing or clamping the two working panels 1 and 2 relative to each other, the illustrated embodiment has the clamping screw 407 threaded through the projection 403a. The screw is of a conical or tapering configuration at its front end and bears against an inclined surface 415 of the fitment member 403 and thus applies a force in the pulling direction. When the projection 403a is pulled into the fitment member 403, the disc portion 412 is deflected outwardly by way of the rocker member 410 pivoting against the force of spring 409.

Figure 20:
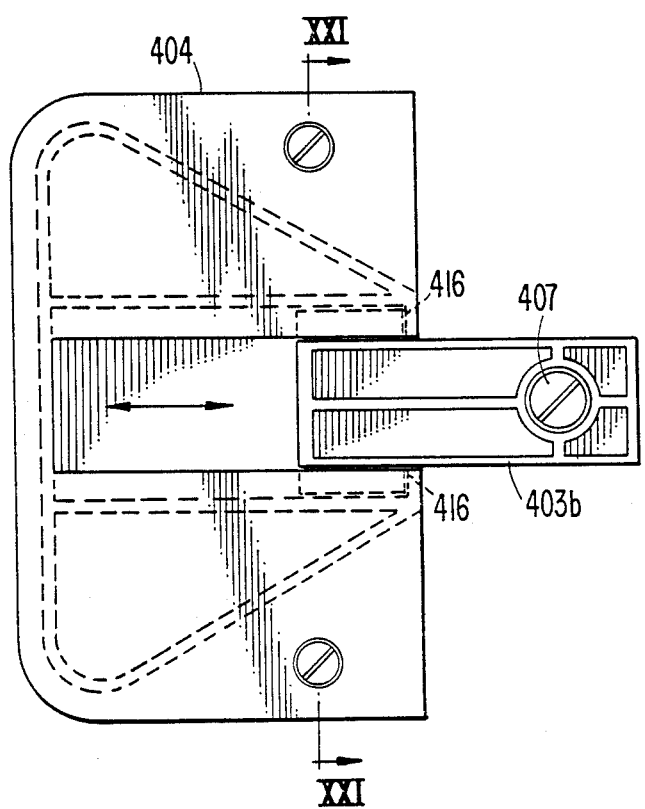
FIG. 20 is a view of an alternative form of the left-hand fitment member shown in FIG. 17.
Figure 21:
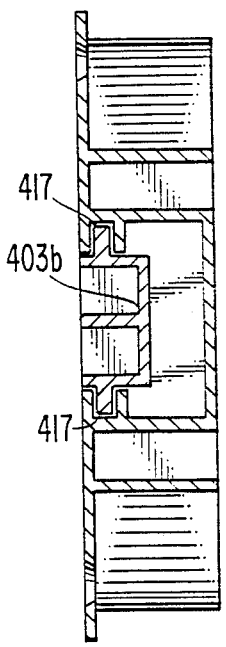
FIG. 21 is a sectional view taken along line XXI—XXI in FIG. 20.
Figure 22:
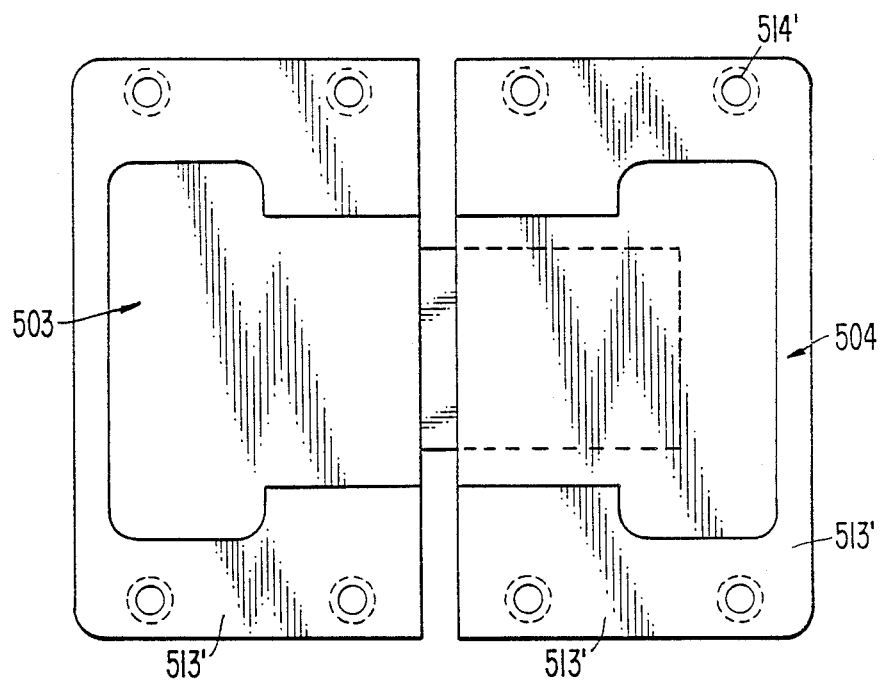
FIG. 22 is a view showing the shape of recesses in plates or panels to be connected by a connector according to a sixth embodiment of the invention.
Figure 23:
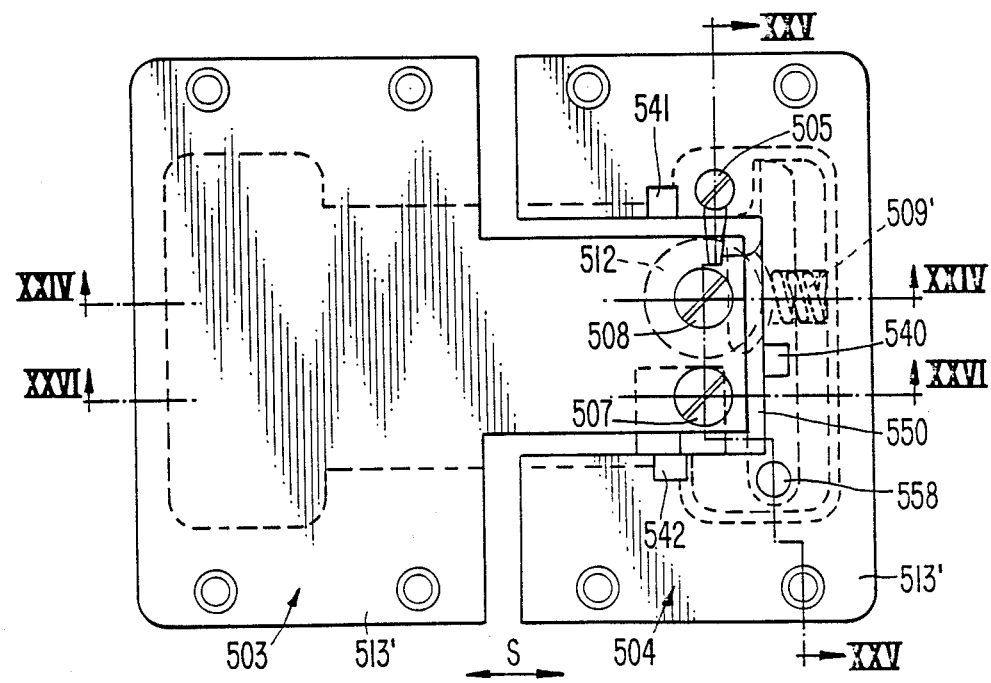
FIG. 23 is a view from below of the sixth embodiment.
Figure 24:
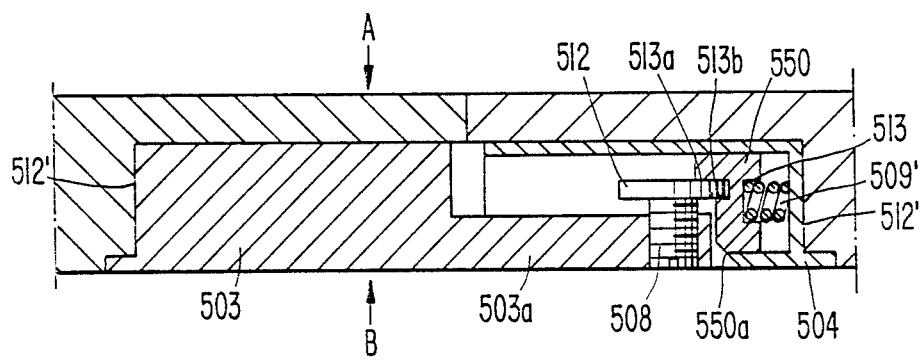
FIG. 24 is a sectional view taken along line XXIV—XXIV of FIG. 23.
Figure 25:
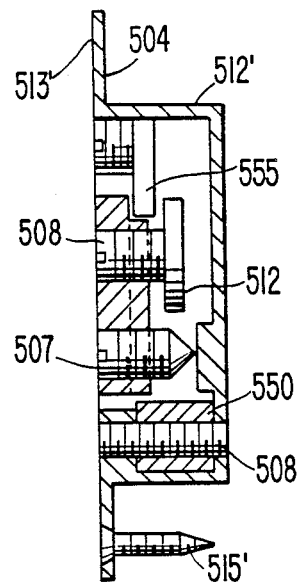
FIG. 25 is a sectional view taken along line XXV—XXV of FIG. 23.

In a modification or alternative form of the fifth embodiment, as shown in FIGS. 20 and 21, a projection 403b is not rigidly connected to the fitment member 404 but is mounted displaceably in the pulling direction in a guide means 417 of groove-and-tongue configuration, with abutments 416 limiting the extent of such displacement. The projection 403b can thus be pushed into the fitment member 404 for the assembly operation and possibly also for transportation purposes. It may be spring-loaded in the direction of the extended position so that it automatically moves into the extended position.

In a sixth embodiment shown in FIGS. 22–27, a connector device shown therein for the fixed and precise mutual connection of two work plates or panels includes two connector fittings or fitment members 503, 504 which are adapted to be inserted into respective recesses formed by milling in the work plates 1, 2. Each connector fitting 503, 504 includes a housing 512' and a flange 513'. The flanges 513' have holes 514' for securing screws 515'. The fitting 503 has a projection or extension 503a extending into fitting 504. A tightening or clamping screw 507 as well as a screw 508 which constitutes an adjustment member are mounted in projection or extension 503a. The clamping screw 507 as well as screw 508 are arranged vertically in the assembly position, that is to say at right angles to the direction of tightening S which is generally horizontal in order to pull the two plates 1, 2 closely together into abutment of end faces thereof. Projection 503a could be retractable into fitting 503 in the manner discussed above relative to FIGS. 20 and 21.

Figure 26:
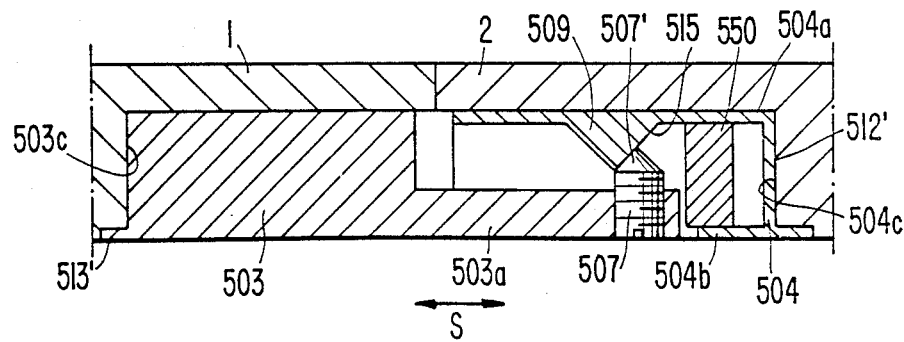
FIG. 26 is a sectional view taken along line XXVI—XXVI of FIG. 23.

The clamping screw 507 therefore is provided with a tapered end 507' which, as shown in FIG. 26, abuts against an inclined surface 515 provided on a shoulder or projection 509 of fitting 504. The further the screw 507 is screwed into the projection 503a of fitting 503, the tighter will fittings 503 and 504 be clamped together.

Screw 508 which constitutes the adjustment member, also serves to ensure the locking or mutual coupling of the two fittings 503, 504 and is provided with a disc-shaped head 512. A lever 550 is supported in connecting fitting 504 for pivotal movement about a rod or bolt 558 which forms a vertical axis. The lever 550 is urged toward screw 508 by a spring 509'. At the side of lever 550 opposite to spring 509' the lever 550 is provided with a notch 513 which is limited by upper and lower end stop faces 513a, 513b. The notch 513 is of segmental configuration as viewed from above, as will be seen best in FIG. 23. The bottom of lever 550 is provided, at least within the range of screw 508, with an inclined face 550a.

Figure 28:
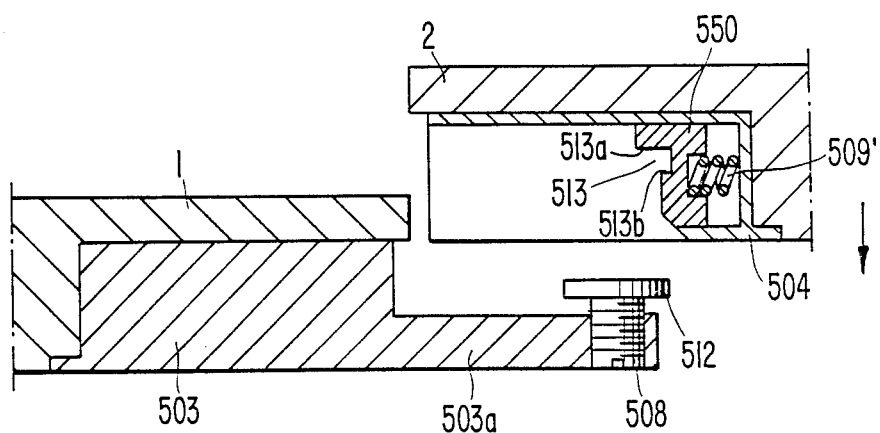
FIG. 28 is a sectional view similar to FIG. 24 but schematically illustrating the manner of initial connection of fitment members of the sixth embodiment.

FIG. 28 shows the position in which the two plates 1, 2 are fitted together. When plate 2 is pressed toward plate 1 as indicated by the arrow in FIG. 28, the disc-shaped head 512 of screw 508 first will contact surface 550a and push lever 550 back in opposition to the loading of spring 509'. The connector fitting 504 with the lever 550 thereby is moved sufficiently toward fitting 503 until the screw head 512 engages in notch 513. Since at the same time the clamping screw 507 engages behind shoulder 509 the connector fittings 503, 504 are thus automatically mutually coupled. Lever 550 functions as a locking part.

Figure 27:
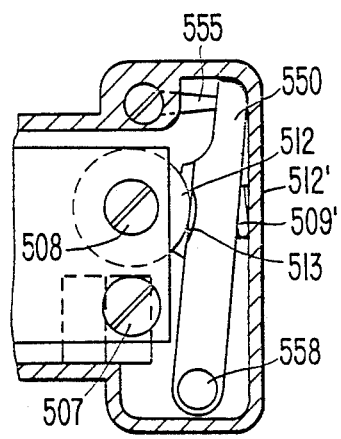
FIG. 27 is a view from below and partially in section in the direction of arrow J in FIG. 24.

From this provisionally coupled or holding position it is possible to effect a relative adjustment of height between plates 1, 2 and thereafter the final clamping together of the plates. Since the notch 513 has upper and lower end stop faces 513a, 513b, the head 512 of screw 508 is positively retained in lever 550. By rotation of screw 508 the fitting 503 then may be moved upwardly or downwardly relative to fitting 504, and by rotation of screw 507 the two plates are clamped together. For improved stability of the connector, the lever 550 is positively retained between two plates 504a, 504b, the former of which is the inner end or bottom of housing 512', as shown in FIG. 26. In order to enable easy disengagement or removal of the connector according to this embodiment of the invention, an eccentric 555 is mounted in connector fitting 504. With the aid of eccentric cam 555, the lever 550, as shown in FIG. 27, can be moved laterally off or away from the head 512 of screw 508 in opposition to the pressure applied by spring 509', whereby the connection between the two connector fittings 503, 504 is released. In the illustrated example the flanges 513' of connector fittings 503, 504 are received in respective recesses 503c, 504c in plates 1, 2 (FIG. 26).

Figure 29:
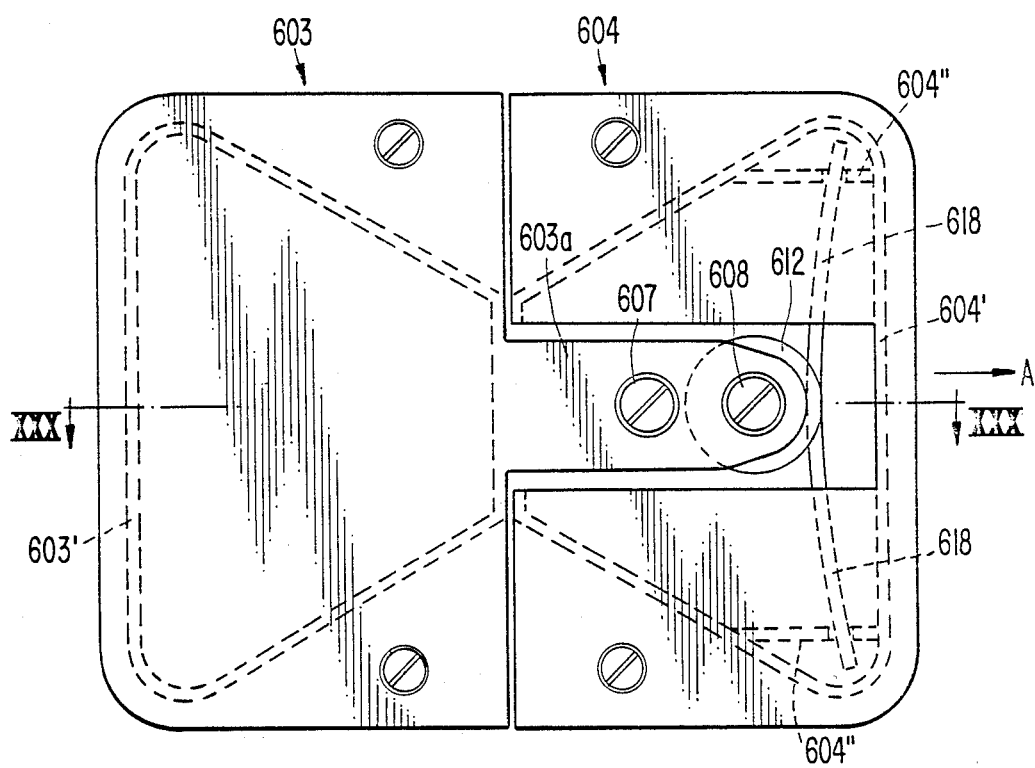
FIG. 29 is a view from below of a seventh embodiment of the connector according to the invention.
Figure 30:
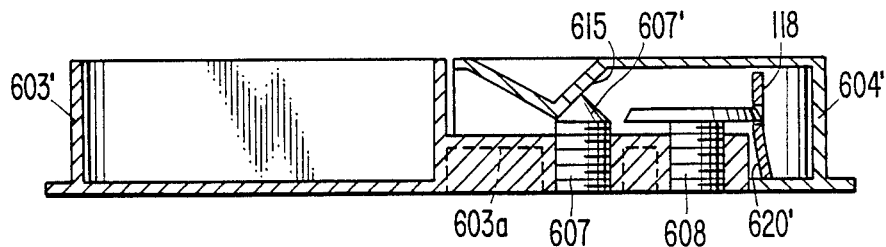
FIG. 30 is a sectional view taken along line XXX—XXX in FIG. 29.
Figure 31:
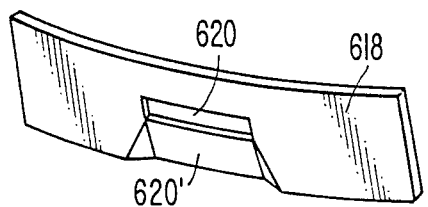
FIG. 31 is a perspective view of a leaf spring member shown in FIGS. 29 and 30.
Figure 32:
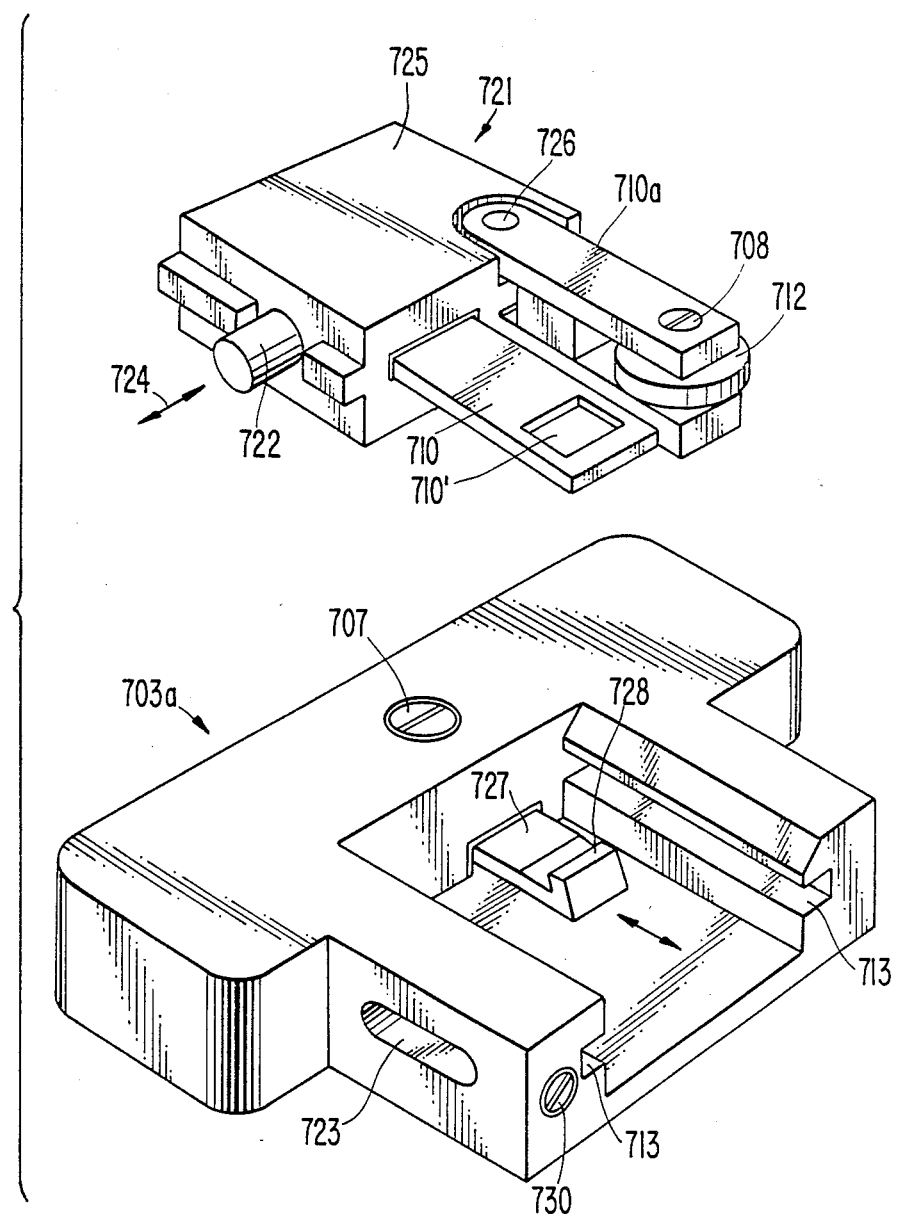
FIG. 32 is a perspective exploded view of one of two main fitment members of identical configuration in an eighth embodiment of the connector according to the invention and of an insert member insertable into either of such main fitment members.

The seventh embodiment shown in FIGS. 29 through 31 is similar in construction to the fifth and sixth embodiments described above. As shown in FIGS. 29 through 31, at its end the projection 603a carries a screw 608 having a disc portion or member 612 which is adjustable with respect to height and which engages into a slot 620 in a leaf spring member 618 which yields in the pulling or clamping direction. In this embodiment also, the projection 603a could be retractable into the fitment member 603, in a manner similar to the construction shown in FIGS. 20 and 21. A leaf spring or spring plate 618 is arranged in fitting 604 instead of lever 550. Leaf spring 618 is supported by webs 604" of fitting 604 which have slits within which the ends of leaf spring 618 are supported. As shown in FIG. 29 the leaf spring 618 is arched or curved towards screw 608 and can yield in the direction of arrow A. In this embodiment the screw 608 which represents the adjustment means for height adjustment of the connector and the clamping screw 607 are arranged behind each other, that is to say in the clamping direction. The clamping screw 607 again is pressed with a conical end 607' thereof against the tapered surface 615 of shoulder 609 on fitting 604. The clamping screw 607 and screw 608 again are supported in extension or projection 603a of connector fitting 603. As will be seen from the drawings the leaf spring 618 has a slit 620 beneath which is formed an inclined face 620' which corresponds to the inclined face 550a of lever 550.

For assembly or mutual connection of plates 1, 2 the plates again are, in a manner similar to the relationship shown in FIG. 28, moved toward each other in directions parallel to the height thereof while being positioned directly mutually adjacent each other. During such movement the head 612 of screw 608 slides along inclined face 620' of leaf spring 618 and bends the latter back in the direction of arrow A in FIG. 29 until head 612 engages in slit 620. Since at the same time the tapered end 607' of screw 607 engages with surface 615, the two connector fittings 603, 604 automatically are locked together. Instead of the slit 620 there might conceivably be provided a mere depression, that is to say a notch, in a manner analogous to the previously described embodiments. The only important feature is that the arrangement be such as to ensure that the head 612 cannot accidentally slip out of engagement with leaf spring 618. As may be observed from FIG. 30, the head 612 is held sufficiently tightly between edges of slit 620 that a relative height adjustment of fittings 603, 604 again is possible by rotation of screw 608.

The two structural elements or work panels, or the associated two connector fittings 503, 504 or 603, 604 can be slightly slidably displaced in or opposite to the clamping direction S (FIG. 26) while the elastic locking member 550 or 618 simply follows such movement and remains in engagement with the height adjustment means. Such sliding in the clamping direction occurs during the tightening of the work plates, and the extent or degree of such sliding displacement may also depend on any finishing operation applied to the end faces of the plates, for example, by an assembler. In the case of an assembly mode which is applied in practice, the maintenance of height adjustment during relative sliding displacements of fittings 503, 504 or 603, 604 or associated plates in or opposite to the clamping direction is found to be of particular advantage. That is, following preliminary assembly from the position shown in FIG. 28 in which locking part 550 engages with or in the height adjustment means (head 512 engages in groove 513, FIG. 24) the parts are lightly clamped together or relatively tightened by means of clamping screw 507. Then precise height adjustment is achieved by turning screw 508 (e.g. and checking the joint between the surfaces of the panels with a finger). Before the plates are finally clamped together the clamping screw 507 may be slackened again. This allows the plates to be slightly relatively separated once more by introduction and turning of a suitable tool (e.g. screwdriver blade) in a recess 540 (FIG. 23) in connector fitting 504 in order to feed adhesive or silicon into the joint between the panels. Subsequently, the final clamping and tightening operation is achieved via screw 507 while the previously completed height adjustment is maintained. While the plates are pushed apart spring 509' relaxes and ensures that lever 550 (the locking part) always remains applied to head or disc 512 of the height-adjusted screw 508.

In order to enable the plates or connector fittings 503, 504 (or 603, 604) to be lined up laterally, that is to say in the direction of the butt joints, the connector fitting 504 is provided with two recesses 541, 542 for the insertion therein of suitable tools (FIG. 23), whereby the projection 503a of fitting 503 can be displaced relative to fitting 504.

In the eighth embodiment of the connector according to the invention, as illustrated in FIGS. 32 through 38, the basic idea is to provide two identical main or basic fitment members 703a and 703b which are already fixedly inserted by the furniture manufacturer into the structural elements to be connected together (for example working panels or work top members), in a manner such that the main fitment members advantageously do not project at all from the structural elements to be connected. The illustrated arrangement also includes an insert member 721 which the person assembling the structural elements selectively inserts on site into one of the two fitment members 703a and 703b and which then performs the height adjustment function and the tie anchor function. Which one of the two main fitment members 703a or 703b is used by the assembler to receive the insert member 721 before the structure elements are assembled will depend on how he has better access to a height adjusting screw 708 and a clamping screw 707 or 707', according to the local factors involved. The main member 703a and the insert member 721 are shown in perspective in FIG. 32. The main member 703a has two grooves 713 which extend in the pulling direction to receive the insert member 721. Such groove-and-tongue connection is highly suitable for play-free transmission of the height adjustment forces which are directed transversely with respect to the pulling direction. So that the insert member can transmit pulling forces acting in the direction of the grooves to the main fitment member 703a, the insert member has a spring-loaded pin 722 which can firstly be pressed into the main fitment member 703a for the purpose of inserting the insert member 721 and which then springs into a slot 723 of member 703a and limits relative displacement therebetween, i.e. the spring-loaded pin is movable in the direction indicated by the double-headed arrow 724.

The insert member includes a body 725 from which project a tie anchor 710 and a spring-loaded rocker member 710a which is mounted rotatably about a pivot axis 726 and which carries a height adjusting disc member 712 and height adjusting screw 708. The tie anchor 710 is in the form of a resilient spring tongue having at an outer end thereof a receiving opening 710' for receipt of a tightening hook 727 or 727' described hereinafter.

Each main fitment member 703a or 703b has a respective tightening hook 727 or 727' which is adjustable in the pulling direction by way of the respective clamping screw 707 or 707'. At the front end of each hook 727 or 727' is a projection or nose 728 or 728', respectively, which is suitable for engaging into the opening 710' in the tie anchor 710 (see in particular FIG. 36), thereby to pull the tie anchor 710 towards it. The hook 727 or 727' is retracted by rotation of the corresponding screw 707 or 707'.

Figure 33:
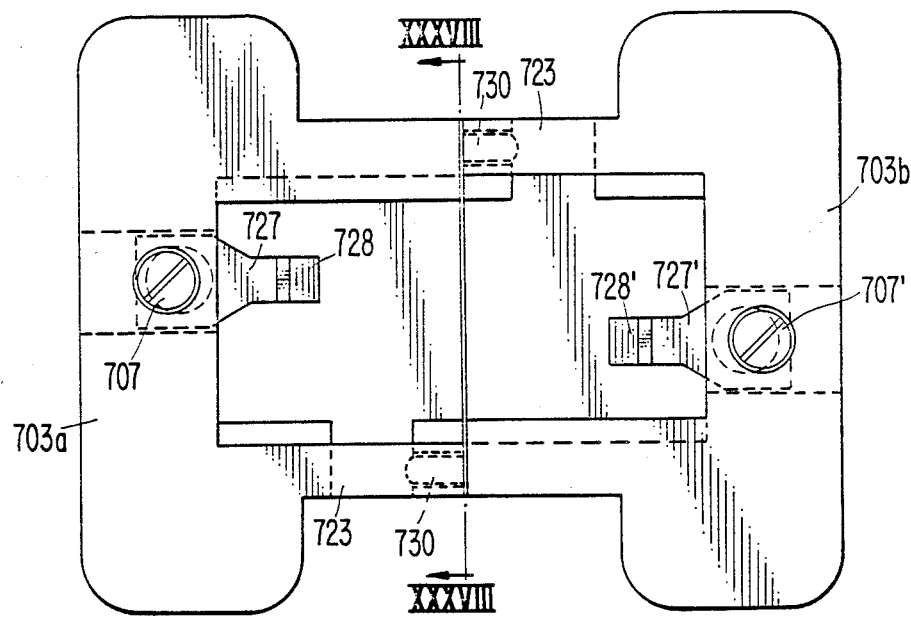
FIG. 33 is a view from below of the two main fitment members of the eighth embodiment shown in a connecting position and without the insert member.
Figure 34:
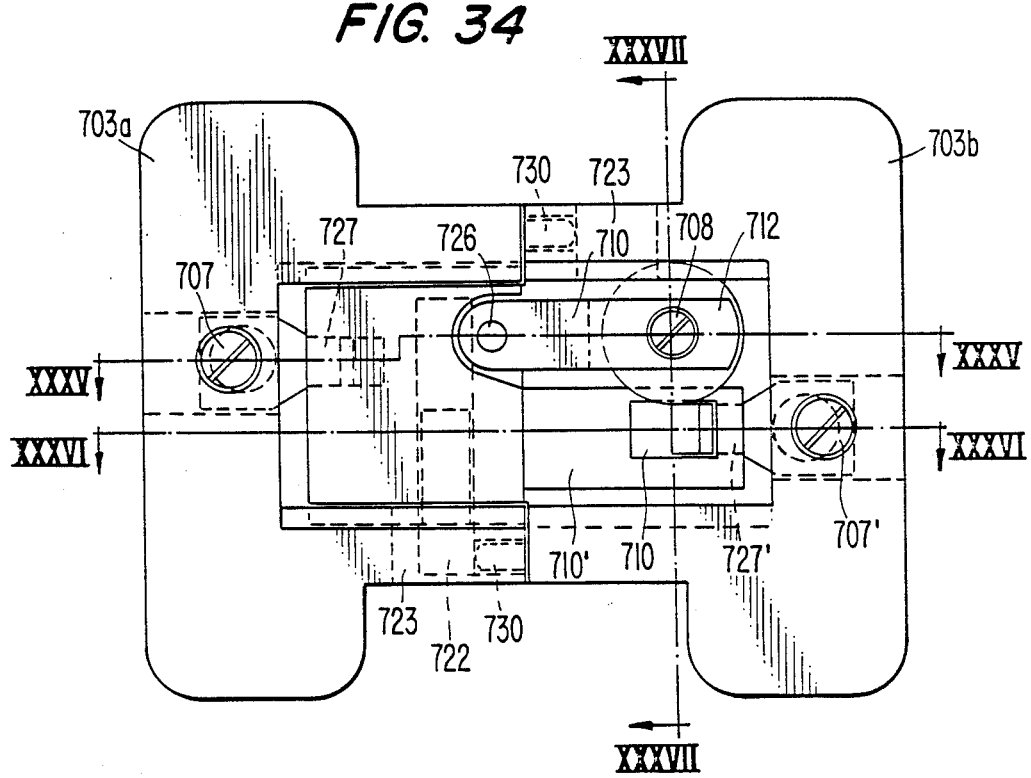
FIG. 34 is a similar view but with the insert member shown in an inserted condition.
Figure 35:
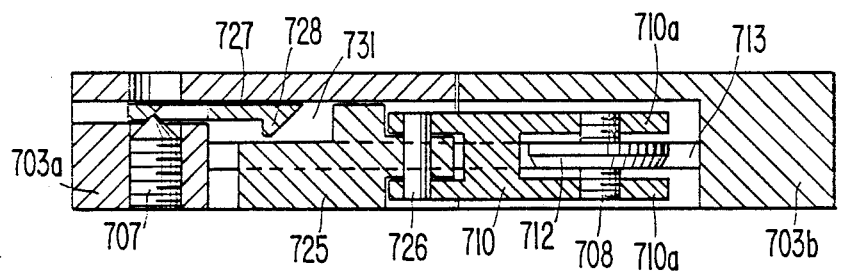
FIGS. 35-38 are sectional views respectively taken along lines XXXV—XXXV, XXXVI—XXXVI, XXXVII—XXXVII, and XXXVIII—XXXVIII in FIGS. 33 and 34.
Figure 36:
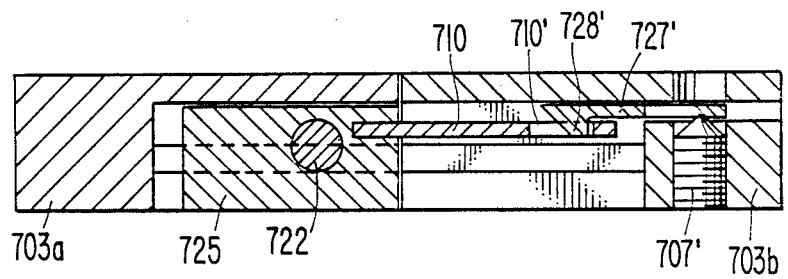

For the purposes of connecting the two structural elements in which the two main fitment members 703a, 703b are already fixedly inserted (without the insert member 721), as shown in FIG. 33, firstly the insert member is fitted from the end into one of the main fitment members (in this case the fitment member 703a). By way of a stop screw 730 which extends into the slot 723, it is possible to fix the position of the insert member 721 relative to the main fitment member 703a, with the spring-loaded pin 722 bearing against the stop screw 730 when the structural elements are subsequently tightened together (see FIG. 34). That way of adjusting the insert member 721 is advantageous if the end faces of the working panels have to be refinished or dressed (for example due to awkward conditions regarding available space), in particular in view of the fact that the hooks 727 and 727' generally are capable of only a relatively short clamping stroke or movement. It should also be mentioned that the position of the insert member 721 in the main fitment member 703a is essentially fixed by way of the stop screw 730 and the spring-loaded pin 722, and not by way of the hook 727 that lies in an inactive condition in a recess 731 in the body 725 of the insert member 721 (see FIG. 35).

Figure 37:
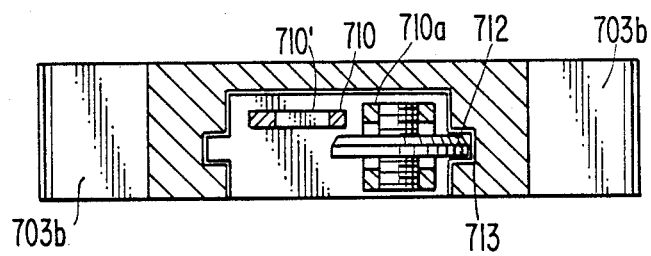
Figure 38:
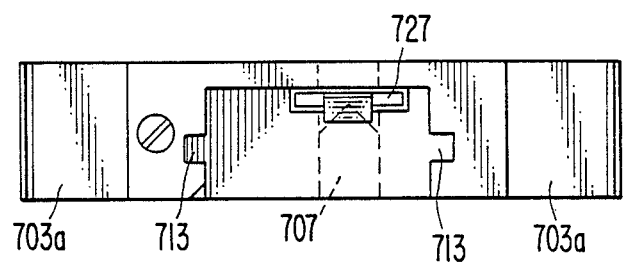

When the structural elements to be connected are brought together at their end faces, the spring tongue 710 and the rocker member 710a thereby are introduced into the oppositely disposed fitment member 703b, the spring tongue 710 snaps into position over the nose 728' on the hook 727' of the fitment member 703b (see FIG. 36), and, under the spring loading of the rocker arm 710a which is towards one groove 713 in member 703b, the disc portion 712 engages into such groove 713 (see FIG. 37). The groove 713 into which the disc portion 712 engages precisely is disposed opposite to the slot 723 in the other fitment 703a in which the insert member 721 is guided. Adjustment with respect to height is effected by way of the screw 708 and the height-adjustment disc portion 712. After precise height adjustment of the two structural elements, they are fixedly pulled together by actuating the screw 707' thereby pulling the hook 727' and the tie anchor 710.

The connector according to the invention is suitable not only for plates or panels but also for connecting other structural elements or components when such elements or components must be in a precise position relative to each other. The connector may be formed of zinc die castings. It is also possible however to use other materials, for example other metals or plastic materials, for example for the fitment housing.

Although the present invention has been described and illustrated with respect to preferred features thereof, it is to be understood that various changes and modifications may be made to the specifically described and illustrated features without departing from the scope of the present invention.

We claim:

1. In a connector for connecting two structural elements, particularly for the endwise connection of two panels, said connector including a pair of fitment members to be mounted on respective of the structural elements in the region of connection therebetween, a tie anchor and associated clamping means for applying a pulling force on said fitment members in a first direction to clamp said fitment members together, and adjusting means for adjusting the relative positions of said fitment members, and thereby of the structural elements to be connected, in a second direction perpendicular to said first direction, the improvement wherein said adjusting means comprises:

a lever pivotally mounted in a first said fitment member for pivotal movement about an axis extending in a third direction perpendicular to both said first and second directions, said lever having a first end to extend into a second said fitment member; and rotatable means operable between said first fitment member and a second end of said lever for pivoting said lever about said axis.

2. The improvement claimed in claim 1, wherein said rotatable means comprises a first screw extending through said second end of said lever and threaded into said first fitment member for rotating said lever in a first direction about said axis, and a second screw threaded through said second end of said lever and abutting said first fitment member for rotating said lever in a second direction about said axis.

3. The improvement claimed in claim 2, wherein said first end of said lever has an enlarged portion snugly fittable into a recess in said second fitment member.

4. The improvement claimed in claim 2, wherein said second fitment member has a hook, and said tie anchor comprises a member slidable in said first direction from said first fitment member toward said second fitment member and engageable with said hook.

5. The improvement claimed in claim 4, wherein said tie anchor comprises a spring plate having therethrough an opening to engage said hook.

6. The improvement claimed in claim 5, wherein said clamping means comprises a clamping member having an inclined surface bearing against an edge of said spring plate, and a screw extending through said clamping member and threaded into said first fitment member.

7. The improvement claimed in claim 1, wherein said rotatable means comprises a grooved member slidably engaging said second end of said lever, and a screw rotatably mounted with respect to said first fitment member and threaded through said grooved member for pivoting said lever in opposite directions about said axis.

8. The improvement claimed in claim 7, wherein said first end of said lever has an enlarged portion snugly fittable into a recess in said second fitment member.

9. The improvement claimed in claim 7, wherein said second fitment member has therein a bar, and said tie anchor comprises a latch pivotally mounted on said first end of said lever and engageable with said bar.

10. The improvement claimed in claim 9, wherein said clamping means comprises an eccentric cam rotatably mounted on said first fitment member and having a cam surface abutting said lever.

11. The improvement claimed in claim 7, further comprising means for selectively retracting said lever fully into said first fitment member.

12. The improvement claimed in claim 11, wherein said retracting means comprises teeth on said second end of said lever and a pinion rotatably mounted on said first fitment member and engaging said teeth.

13. In a connector for connecting two structural elements, particularly for the endwise connection of two panels, said connector including a pair of fitment members to be mounted on respective of the structural elements in the region of connection therebetween, a tie anchor and associated clamping means for applying a pulling force on said fitment members in a first direction to clamp said fitment members together, and adjusting means for adjusting the relative positions of said fitment members, and thereby of the structural elements to be connected, in a second direction perpendicular to said first direction, the improvement wherein said adjusting means comprises:

a first sleeve to be fitted nonrotatably in a first structural element;

a second sleeve to be fitted in a second structural element;

said tie anchor extending through said first and second sleeves; and cooperable means on said second sleeve and on said first sleeve or mountable in the second structural element for engagement with said second sleeve for enabling rotation of said second sleeve relative to said first sleeve about said tie anchor.

14. The improvement claimed in claim 13, wherein said cooperable means comprise at least one internal surface of said first sleeve, and at least one projection extending axially from said second sleeve into said first sleeve, whereby upon rotation of said second sleeve said projection abuts said surface of said first sleeve.

15. The improvement claimed in claim 13, wherein said cooperable means comprise an outer surface of said second sleeve in engagement with an eccentric inner surface of a bush surrounding said second sleeve, said tie anchor extending eccentrically through said second sleeve.

16. In a connector for connecting two structural elements, particularly for the endwise connection of two panels, said connector including a pair of fitment members to be mounted on respective of the structural elements in the region of connection therebetween, a tie anchor and associated clamping means for applying a pulling force on said fitment members in a first direction to clamp said fitment members together, and adjusting means for adjusting the relative positions of said fitment members, and thereby of the structural elements to be connected, in a second direction perpendicular to said first direction, the improvement wherein said adjusting means comprises:

an elastically yieldable member mounted in a first said fitment member and biased toward a second said fitment member; and rotatable means, rotatably mounted on one of said yieldable member or said second fitment member and engageable in the other of said second fitment member or said yieldable member, for moving said first and second fitment members relative to each other in said second direction.

17. The improvement claimed in claim 16, wherein said tie anchor comprises a projection extending from said second fitment member and insertable into said first fitment member.

18. The improvement claimed in claim 17, wherein said projection is integral with said second fitment member.

19. The improvement claimed in claim 17, wherein said projection is slidably retractable into said second fitment member.

20. The improvement claimed in claim 17, wherein said clamping means comprises a screw threaded through said projection and having an end abutting an inclined surface of said first fitment member.

21. The improvement claimed in claim 20, wherein said end of said screw is conical.

22. The improvement claimed in claim 16, wherein said elastically yieldable member comprises a lever pivotally mounted at one end thereof to said first fitment member, and further comprising spring means urging said lever toward said second fitment member.

23. The improvement claimed in claim 22, wherein said rotatable member comprises a screw threaded through said lever and having a member snappingly engageable in a groove in said second fitment member.

24. The improvement claimed in claim 23, wherein said groove is formed in a projection extending from said second fitment member.

25. The improvement claimed in claim 23, wherein said member on said lever is disc-shaped.

26. The improvement claimed in claim 22, wherein said rotatable member comprises a screw threaded through said second fitment member and having a member snappingly engageable in a groove in said lever.

27. The improvement claimed in claim 26, wherein said screw is threaded through a projection extending from said second fitment member.

28. The improvement claimed in claim 26, wherein said member on said screw is disc-shaped.

29. The improvement claimed in claim 26, wherein said groove in said lever is segment-shaped.

30. The improvement claimed in claim 26, wherein said lever has an inclined surface adjacent said groove.

31. The improvement claimed in claim 16, wherein said elastically yieldable member comprises a leaf spring mounted in said first fitment member.

32. The improvement claimed in claim 31, wherein said rotatable member comprises a screw threaded through said second fitment member and having a member snappingly engageable in a slit in said leaf spring.

33. The improvement claimed in claim 32, wherein said screw is threaded through a projection extending from said second fitment member.

34. The improvement claimed in claim 32, wherein said member on said screw is disc-shaped.

35. The improvement claimed in claim 32, wherein said leaf spring has an inclined surface adjacent said slit.

36. The improvement claimed in claim 31, wherein said leaf spring has opposite ends loosely supported by said first fitment member.

37. The improvement claimed in claim 16, wherein said first and second fitment members are operably of substantially identical configuration, and further comprising an insert member mountable into a selected either one of said fitment members, said insert member carrying said tie anchor and said adjusting means, and said clamping means being operable from the other said fitment member.

38. The improvement claimed in claim 37, wherein said fitment members are die castings.

39. The improvement claimed in claim 37, wherein said clamping means comprises a clamping hook mounted in each said fitment member and a respective bolt threaded into each said fitment member such that, upon threading each said bolt relative to said respective fitment member, a portion of said bolt moves the respective said clamping hook in said first direction.

40. The improvement claimed in claim 39, wherein said tie anchor has therein an opening receiving said clamping hook of said other fitment member.

41. The improvement claimed in claim 39, wherein said clamping hook has therein an opening, and said portion of said bolt comprises a conical end abutting an edge of said opening.

42. The improvement claimed in claim 41, wherein said die castings are of zinc.

43. The improvement claimed in claim 37, wherein said insert member is mounted into said selected one fitment member by a tongue-in-groove connection for relative movement in said first direction.

44. The improvement claimed in claim 43, wherein each said fitment member has therein grooves extending in said first direction, and said insert member has tongues slidably insertable into said grooves of said selected one fitment member.

45. The improvement claimed in claim 43, wherein each said fitment member has therein a slot extending in said first direction, and displacement of said insert member relative to said selected one fitment member in said first direction is limited by a pin on said insert member extending into said slot in said selected one fitment member.

46. The improvement claimed in claim 45, wherein said pin is spring loaded and pressable into said insert member, such that said pin is removable from said slot and said insert member is removable from said selected one fitment member.

47. The improvement claimed in claim 45, further comprising means for adjusting the displacement of said pin in said slot in said first direction.

48. The improvement claimed in claim 47, wherein said displacement adjusting means comprises a screw adjustably extending through said selected one fitment member into said slot therein, each said fitment member having a respective said screw.

49. The improvement claimed in claim 37, wherein each said fitment member has mounted thereon a respective said clamping means displaceable by a limited extent in said first direction, said tie anchor engaging said clamping means of said other fitment member, and said clamping means of said selected one fitment member being inactive.

50. The improvement claimed in claim 37, wherein said insert member includes a body portion fitted into said selected one fitment member, said tie anchor extending from said body portion toward said other fitment member, and further comprising a projection extending from said body portion toward said other fitment member and including said adjusting means.

51. The improvement claimed in claim 50, wherein said tie anchor comprises an elastic spring member having in a free end thereof an opening for receiving said clamping means.

52. The improvement claimed in claim 50, wherein said projection is pivoted to said body portion about an axis extending in said second direction.

53. The improvement claimed in claim 52, wherein each said fitment member has therein grooves extending in said first direction, and a free end of said projection carries a disc member received in a said groove of said other fitment member.

54. The improvement claimed in claim 53, wherein each projection is spring biased about said axis in a direction to urge said disc member into said groove receiving said disc member.

55. The improvement claimed in claim 53, wherein said body portion is slidably mounted in said grooves of said selected one fitment member.

56. The improvement claimed in claim 53, wherein the periphery of said disc member is beveled to facilitate introduction thereof into said groove.

57. The improvement claimed in claim 53, wherein said adjusting means comprises a bolt mounting said disc member and threaded to said free end of said projection for movement relative thereto in said second direction.

* * * * *